(12) United States Patent
Luecke et al.

(10) Patent No.: US 7,839,916 B1
(45) Date of Patent: Nov. 23, 2010

(54) SYSTEMS AND METHODS FOR COMMUNICATION IN A GLOBAL POSITIONING SYSTEM (GPS) DEVICE

(75) Inventors: James R. Luecke, Mission Viejo, CA (US); Joseph M. Nicosia, Carlsbad, CA (US)

(73) Assignee: L-3 Communications Corporation, Anaheim, CA (US)

( * ) Notice: Subject to any disclaimer, the term of this patent is extended or adjusted under 35 U.S.C. 154(b) by 1775 days.

(21) Appl. No.: 10/962,165

(22) Filed: Oct. 8, 2004

Related U.S. Application Data

(60) Provisional application No. 60/509,832, filed on Oct. 8, 2003.

(51) Int. Cl.
  *H04B 1/00* (2006.01)
(52) U.S. Cl. .................................................... 375/147
(58) Field of Classification Search ................ 375/140, 375/142, 147, 150; 342/357.06, 357.1
See application file for complete search history.

(56) References Cited

U.S. PATENT DOCUMENTS

| | | | |
|---|---|---|---|
| 3,728,632 A | 4/1973 | Ross | |
| 5,361,070 A | 11/1994 | McEwan | |
| 5,748,891 A | 5/1998 | Fleming et al. | |
| 5,886,665 A * | 3/1999 | Dosh et al. | 342/357.06 |
| 5,945,944 A * | 8/1999 | Krasner | 342/357.06 |
| 5,977,909 A | 11/1999 | Harrison et al. | |
| 6,002,708 A | 12/1999 | Fleming et al. | |
| 6,088,384 A * | 7/2000 | Hindman | 375/150 |
| 6,160,841 A * | 12/2000 | Stansell et al. | 375/148 |
| 6,292,132 B1 | 9/2001 | Wilson | |
| 6,353,412 B1 | 3/2002 | Soliman | |
| 6,385,268 B1 | 5/2002 | Fleming et al. | |
| 6,400,754 B2 | 6/2002 | Fleming et al. | |
| 6,466,958 B1 | 10/2002 | Van Wechel et al. | |

(Continued)

OTHER PUBLICATIONS

Leonard E. Miller, *Why UWB? A Review of Ultrawideband Technology*, Report to NETEX Project Office, DARPA, National Institute of Standards and Technology (NIST) Apr. 2003 [online], [retrieved Sep. 29, 2004]. Retrieved from the Internet < http://www.antd.nist.gov/wctg/manet/NIST_UWB_Report_April03.pdf >.

(Continued)

*Primary Examiner*—David C Payne
*Assistant Examiner*—Leon-Viet Q Nguyen
(74) *Attorney, Agent, or Firm*—Knobbe Martens Olson & Bear LLP

(57) ABSTRACT

An apparatus and methods for communicating between or among global positioning system (GPS) receivers enhanced with wideband transmitters, which can include ultra wideband (UWB) transmitters. In one embodiment, WB pulses are precorrected by a transmitter to align with a clock common to both enhanced GPS receivers for autocorrelation, thereby simplifying WB or UWB receiver circuitry. One embodiment includes a circuit and method for adjusting the timing of a pulse by phase shifting the pulse by adjusting amplitude. The wideband pulses are used to communicate data between enhanced GPS receivers. A relatively long code can also be communicated between enhanced GPS receivers, thereby permitting the same WB signal to be used to determine range between the enhanced GPS receivers. The communicated data can include the absolute position of the enhanced GPS receiver, which when combined relative positioning from ranging data, can advantageously permit cooperatively positioning and/or navigation.

21 Claims, 13 Drawing Sheets

U.S. PATENT DOCUMENTS

| | | | |
|---|---|---|---|
| 6,639,939 B1* | 10/2003 | Naden et al. | 375/140 |
| 6,795,491 B2 | 9/2004 | Fleming et al. | |
| 6,839,022 B1* | 1/2005 | Benco et al. | 342/357.1 |
| 6,850,557 B1* | 2/2005 | Gronemeyer | 375/150 |
| 6,853,675 B1* | 2/2005 | Oleynik | 375/130 |
| 6,931,055 B1* | 8/2005 | Underbrink et al. | 375/150 |
| 7,013,165 B2* | 3/2006 | Yoon et al. | 455/561 |
| 7,027,918 B2 | 4/2006 | Zimmerman et al. | |
| 7,183,971 B1* | 2/2007 | Lloyd et al. | 342/357.09 |
| 2001/0051527 A1* | 12/2001 | Kuwahara et al. | 455/456 |
| 2002/0181565 A1* | 12/2002 | Boyd et al. | 375/152 |
| 2003/0013146 A1* | 1/2003 | Werb | 435/9 |
| 2003/0164763 A1* | 9/2003 | Hisano et al. | 340/539.13 |
| 2004/0008138 A1* | 1/2004 | Hockley et al. | 342/357.09 |
| 2004/0034471 A1* | 2/2004 | Rorabaugh | 701/214 |
| 2004/0233972 A1* | 11/2004 | Karaoguz | 375/130 |
| 2005/0026563 A1* | 2/2005 | Leeper et al. | 455/41.1 |
| 2005/0124374 A1* | 6/2005 | Riley et al. | 455/525 |
| 2005/0220051 A1* | 10/2005 | Lavean | 370/330 |
| 2008/0151967 A1* | 6/2008 | Fullerton et al. | 375/145 |

OTHER PUBLICATIONS

Correal, Neiyer S., et al., *An UWB Relative Location System*, IEEE Conference on Ultra Wideband Systems and Technologies, Nov. 2003 [online], [retrieved on Sep. 10, 2004] Retrieved from the Internet < http://www.ee.vt.edu/~ha/research/uwb/sensor_static_location/uwb_relative_location.pdf >.

Fleming, Robert, et al., *Rapid Acquisition for Ultra-Wideband Localizers*, [online], [retrieved on Sep. 17, 2004] Retrieved from the Internet <http://www.aetherwire.com/Aether_Wire/Rapid_Acquisition_for_UWB_Transceivers.pdf >.

\* cited by examiner

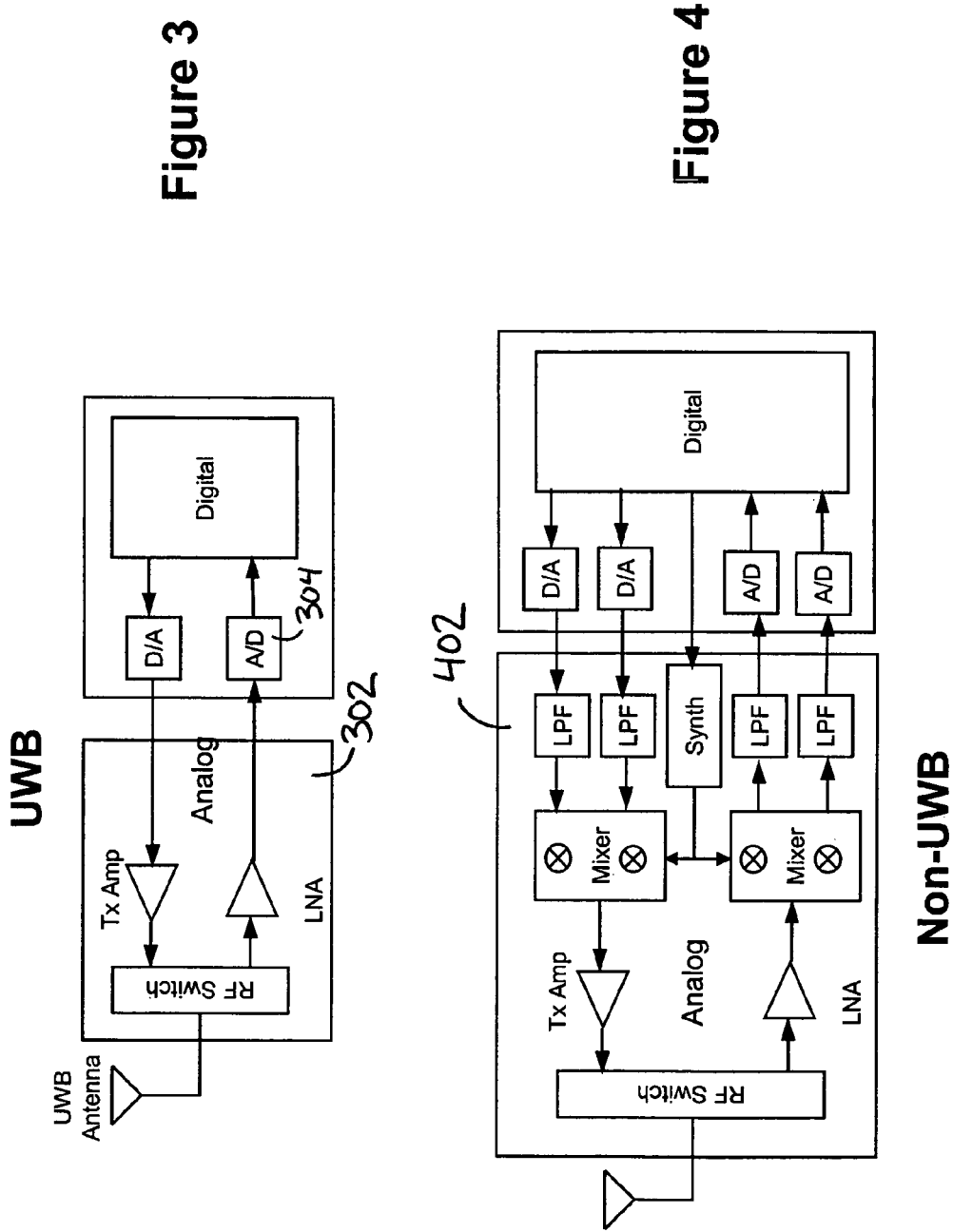

SYSTEMS AND METHODS FOR COMMUNICATION IN A GLOBAL POSITIONING SYSTEM (GPS) DEVICE

RELATED APPLICATION

This application claims the benefit under 35 U.S.C. §119 (e) of U.S. Provisional Application No. 60/509,832, filed Oct. 8, 2003, the entirety of which is hereby incorporated by reference.

BACKGROUND

1. Field of the Invention

The invention generally relates to electronics. In particular, the invention relates to positioning and/or navigation with enhanced Global Positioning System (GPS) devices.

2. Description of the Related Art

The Global Positioning System (GPS) Operational Constellation nominally includes of 24 earth orbiting satellites. Each satellite radiates a spread spectrum, pseudorandom noise (PN) signal indicating the satellite's position and time. A GPS receiver tuned to receive the signals from the satellites can compute the distance to the satellites and calculate the receiver's position, velocity, and time. The receiver calculates the distance to a satellite by multiplying the propagation rate of the satellite's radio signal (the speed of light) by the time it took the signal to travel from the satellite to the receiver.

Each satellite transmits two carrier signals referred to as L1 and L2. L1 operates at a frequency of 1.57542 GHz and L2 operates at a frequency of 1.22760 GHz. Multiple binary codes induce phase modulation upon the L1 and L2 carrier signals. Each satellite in the GPS Operational Constellation transmits a unique code over the L1 and L2 carrier signals. One of the phase-modulated signals is C/A Code (Coarse Acquisition). Another phase-modulated signal is the P-Code (Precise). The P-Code is similar to the C/A Code in that it is a PN sequence which phase modulates a carrier signal. The P-Code modulates both the L1 and the L2 signals at a rate of 10.23 MHz. In an Anti-Spoofing mode, the P-Code is encrypted to produce the Y-Code to restrict access to users with the encryption key. The P-Code forms the basis for the military's Precise Positioning Service (PPS).

GPS systems provide absolute location or position information. Although relatively precise and accurate, navigation and/or positioning via GPS alone can be insufficiently accurate in the context of multiple vehicles that are traveling together. In addition, there are relatively many environments in which reception to GPS signals is relatively difficult. Examples of these environments include: indoors, such as inside a building or a parking structure, in a canyon, in a cave, in a tunnel, on a city street adjacent to relatively tall obstructions or obscurations such as buildings, in space outside the orbit of the GPS satellite constellation, such as a geosynchronous orbit, environments with interference, and the like.

In addition, conventional ultra wideband (UWB) communication techniques can be used for ranging between UWB transceivers. However, conventional techniques for UWB are relatively difficult to implement in practice, as UWB pulses are typically quite narrow pulses and are notoriously difficult to acquire and maintain acquisition. Conventional circuits used to detect UWB signals are large, expensive, and typically consume a relatively large amount of power, which can be disadvantageous in portable battery-powered devices.

SUMMARY

Embodiments include a global position system (GPS) receiver advantageously enhanced with a wideband (WB) or ultra wideband (UWB) transceiver to communicate with other enhanced GPS receivers. The communication can be used for ranging and also to communicate data, such as a GPS-measured absolute position of a receiver. In one embodiment, WB pulses are precorrected by a transmitter to align with a common clock, such as a GPS system time clock, common to both enhanced GPS receivers for autocorrelation, thereby greatly simplifying WB or UWB receiver circuitry for alignment of WB or UWB pulses.

One embodiment includes a circuit and method for adjusting the timing of a pulse by effectively phase shifting the pulse by adjusting the amplitude of points in time of the pulse. The wideband pulses are used to communicate data between enhanced GPS receivers. A relatively long code can also be communicated between enhanced GPS receivers, thereby permitting the same WB signal to be used to determine range between the enhanced GPS receivers. The communicated data can include absolute position of the enhanced GPS receiver, which when combined with the ranging data, can advantageously permit enhanced GPS receivers to cooperatively localize position and/or navigate together.

One embodiment includes a method of autocorrelation in a direct-sequence spread spectrum (DSSS) receiver, where the method includes: generating a clock signal that is common to a system including the DSSS receiver; using boundaries of the clock signal as timing references for sampling windows; and using the sampling windows to sample a DSSS signal.

One embodiment includes a method of timing a local direct-sequence spread spectrum (DSSS) signal, where the local DSSS signal is sent from a first device to a second device, where the method includes: receiving one or more satellite navigation signals in the first device; receiving one or more satellite navigation signals in the second device; and sending symbols of the local DSSS signal from the first device to the second device such that the symbols of the local DSSS signal are substantially time-aligned with a predetermined offset from satellite system time.

One embodiment includes a method in a first node of determining range from a second node, where the method includes: receiving ultra wideband (UWB) pulses transmitted from the second node, where the UWB pulses encode a pseudorandom noise (PN) ranging code; using a replica code to determine an offset in the code; and using the offset to determine range to the second node.

One embodiment includes a method of determining an indirectly-calculated absolute position of a first node, where the method includes: determining ranges among at least a subset of a plurality of nodes including between the first node and a second node, where the second node is aware of an absolute position, where none of the plurality of nodes correspond to a space vehicle of a satellite positioning system, wherein the ranges are determined with greater precision than is attainable from a satellite positioning system; using the ranges to resolve relative positioning at least with respect to the second node; receiving an indication of the absolute position of the second node; and combining the indication of the absolute position of the second node and the relative positioning to the second node to compute the indirectly-calculated absolute position of the first node.

One embodiment includes a dual mode receiver that has GPS receiver and a UWB or WB transceiver. The dual mode receiver combines GPS positioning with UWB or WB.

One embodiment includes a tri-mode receiver that has a GPS receiver and a UWB or WB transceiver. The tri-mode receiver combines GPS positioning, ranging with UWB or WB, and messaging via UWB or WB.

One embodiment includes a technique to encode a pseudorandom noise (PN) ranging code with UWB pulses. Advantageously, the PN ranging codes permit UWB pulses to be used to resolve ranging unambiguously over relatively long distances.

One embodiment includes a technique of UWB pulse or WB impulse modulation timing precorrection. A transmitter precorrects, such as by advancing or delaying, a UWB pulse or WB modulating impulse to arrive at a receiver at an expected time window, such as coincident with a code chip or chip boundary aligned to GPS system time.

One embodiment includes a technique of adjusting the timing of a pulse by adjusting the amplitude of points of the pulse, thereby shifting the phase of the pulse.

One embodiment includes a technique to range and communicate between nodes with the same signal. In one embodiment, the signal corresponds to UWB pulses.

One embodiment includes a technique to acquire a UWB signal using a parallel correlator or fast acquisition correlator for relatively fast acquisition. In one embodiment, the UWB signals are aligned to GPS system time, thereby permitting a receiver with both GPS and UWB receiving capability to acquire the UWB signals relatively quickly.

One embodiment includes a method of cooperatively positioning or navigating. By computing relatively precise relative positioning via ranging between nodes and using estimates of absolute position, the overall absolute positioning or navigation can be improved over GPS alone or over systems using a combination of GPS and an inertial measurement unit (IMU).

The GPS receiver can be used in many terrestrial applications, such as in vehicles, in portable devices, and the like. Embodiments can also be used in outer space, such as in geosynchronous satellites, where conventional GPS techniques are inadequate.

One embodiment includes routing of network signals at least partially based on relative positioning of nodes.

One embodiment includes an enhanced positioning device including: a GPS receiver configured to calculate GPS system time; and a UWB or WB transceiver in communication with the GPS receiver to receive a timing signal at least partially based on GPS system time, where the UWB or WB transceiver is adapted to receive UWB pulses or WB impulses in at least one of two modes, including an autocorrelation mode.

BRIEF DESCRIPTION OF THE DRAWINGS

The drawings (not to scale) and the associated description herein are provided to illustrate embodiments and are not intended to limit the scope of the invention.

FIG. 3 illustrates an example of a UWB pulse transceiver.

FIG. 4 illustrates an example of a WB transceiver.

DETAILED DESCRIPTION

Figure 1:
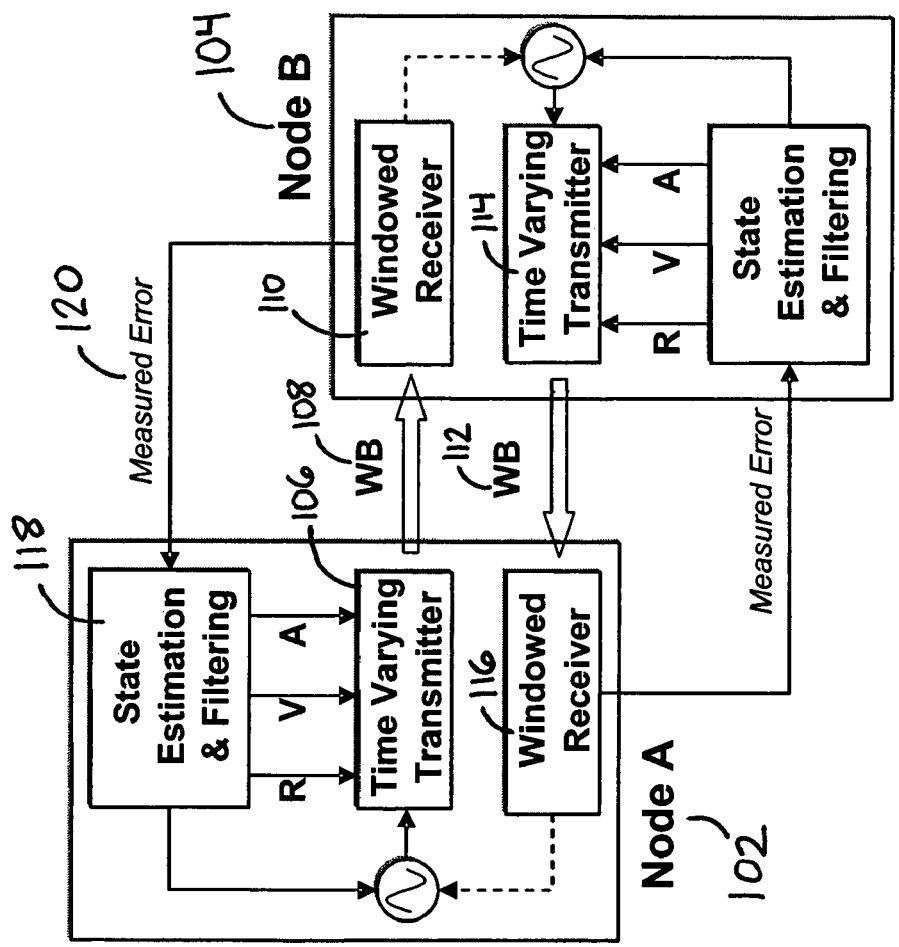
FIG. 1 illustrates two wideband (WB) transceivers in communication with each other.

The description that follows describes certain embodiments, other embodiments that are apparent to those of ordinary skill in the art include embodiments that do not provide all of the benefits and features set forth herein.

Embodiments can be used to enhance Global Positioning System (GPS) performance in a wide range of environments. For example, embodiments can be used to augment GPS performance to increase accuracy over that attainable by using GPS alone, to provide an additional tracking mechanism in a GPS-denied environment, such as in a building, to provide ranging among multiple vehicles in relative close proximity to each other, and the like. It will be understood that GPS technologies can be used to estimate a location (positioning) for a GPS receiver, to provide an indication of where the receiver is. This positioning information can then be used as a navigational aid or as an input to a navigation process to guide a vehicle, robot, individual, and the like, to a particular destination.

For example, in a "smart highway," it can be advantageous to align multiple vehicles traveling together in relative close proximity to reduce overall wind resistance. In another example, on a farm, a group of tractors can advantageously be navigated with greater relative precision than provided by GPS techniques alone, thereby permitting a more precise alignment and spacing between tractors, thereby efficiently enhancing yield on the farm.

In another example, the more precise navigation techniques are utilized to align smart weapons systems, such as airborne vehicles, including bombs, missiles, cruise missiles, artillery shells, and the like. These techniques can permit a series of relatively precisely-aligned weapons to strike a common point in rapid succession with a degree of geometric alignment not attainable from GPS alone. For example, the receivers can be used by a group of airborne vehicles. The airborne vehicles can be navigated with a relatively high-degree of precision. In one embodiment, a coarse absolute positioning measurement, such as GPS, is combined with a fine relative positioning measurement, such as with wideband (WB) ranging techniques or ultra wideband (UWB) ranging techniques. The ranging information can be communicated among the airborne vehicles to precisely align the vehicles. In one embodiment, the same transceivers that are used for ranging are also used for data communication, thereby saving cost, size, and power. In another embodiment, the ranging data that is communicated to an airborne vehicle is formatted such that the data can be decoded by the GPS receiver as a GPS channel. For example, a GPS receiver can include multiple GPS channels, such as 12 channels, to track multiple GPS satellites.

While illustrated generally in the context of the GPS system and the P(Y) code, the skilled practitioner will appreciate that the principles and advantages described herein are also applicable to the P code, C/A code, planned M code, and to systems yet to be developed, including, for example, the planned Galileo positioning system. In addition, it will be understood that the various circuits, architectures, processes, and techniques disclosed herein can be implemented in a variety of ways. For example, various modules can be implemented in hardware, such as in application specific integrated circuits (ASICs), field programmable gate arrays (FPGAs), and the like, in software or firmware executed by a microprocessor, a microcontroller, a licensable microprocessor core embedded in an ASIC, and the like, or via a combination of both hardware and software. An example of a licensable core is the ARM core from ARM, Ltd.

Overview of GPS with WB Integration

FIG. 1 illustrates two wideband (WB) transceivers in communication with each other. As used herein, the term "node" will be used to refer to an enhanced GPS receiver or to a device or other entity, including a human, using or embodying the enhanced GPS receiver.

A first node (node A) 102 is physically spaced apart from a second node (node B) 104. Each of the first node 102 and the second node 104 includes a GPS receiver and wideband (WB) transceiver or an ultra wideband (UWB) transceiver. An example of a front end of an integrated receiver with both GPS and UWB will be described later in connection with FIG. 2. In addition, FIGS. 3 and 4 illustrate examples of receiver front ends for UWB and for WB, respectively.

A WB transmitter 106 of the first node 102 transmits a WB signal 108 to a WB receiver 110 of the second node 104. As will be explained in greater detail later in connection with FIGS. 11, 14, and 15, the timing of the pulses from the WB transmitter 106 can be adjusted or "precorrected" to arrive within an expected time window at the WB receiver 110 of the second node 104. For example, the expected time window can correspond to a GPS system time clock signal to which the second node 104 is already synchronized. In one example, the UWB pulses can be precorrected to arrive coincident with an edge or boundary of the GPS clock signal, or a predetermined time offset therefrom to avoid interference, to share analog-to-digital converters, and the like.

The GPS system time is used by all GPS satellites and receivers as a reference for a GPS satellite ranging signal. The GPS system time can be generated by receiving GPS satellite signals. It will be understood that other satellite navigation systems, such as those planned in the future, can have corresponding system time signals.

This synchronization to GPS system time simplifies reception and detection of desired WB or UWB pulses. It will be understood that during the initial synchronization or acquisition process between nodes, the timing of the pulses can be varied over time and synchronization to these pulses is typically more complicated. However, the post-acquisition simplification in receiving the pulses can save significant amounts of computational power, reduce redundancy in circuitry, and reduce power consumption. For example, a single relatively high-speed circuit can be used to initially synchronize to the WB signals or UWB pulses from a particular transceiver, and a plurality of relatively low-speed circuits can be used to receive UWB pulses from a plurality of transceivers.

In addition, over a period of time, the timing can also be varied to account for timing variations, such as timing variations due to changes over time in distance between the nodes. A technique that can be used to adjust the timing of a pulse from a transmitter will be described in greater detail later in connection with FIGS. 12, 13A, and 13B.

In one embodiment, the transmitted WB signal 108 carries a relatively long pseudorandom noise (PN) ranging code, which can be similar to a GPS PN ranging code. The PN ranging code lengthens the unambiguous measurement range. These PN ranging codes can be repeating codes functionally similar to the coarse-acquisition (C/A) code, precise encrypted P(Y) code, and the like. These PN ranging codes can advantageously be used to permit the second node 104 receiving the WB signal 108 to determine a distance or pseudorange from the first node 102 transmitting the WB signal 108 with the PN ranging code. In a system with GPS, the GPS system time can also be used as a timing reference for the PN code, and the pseudorange measurement can be ascertained by measuring a code phase offset between a replica code and the PN ranging code. It should be noted that the GPS system time is used by all GPS satellites and receivers as a reference for a GPS satellite ranging signal. It will also be understood that the length of suitable PN ranging codes can vary greatly depending on the distance over which ranging and data transfer is desired. For example, where an embodiment is intended to be used over a relatively long distance, such as between satellites in geosynchronous orbit, the PN ranging code should correspond to a relatively long code. The PN ranging codes will be discussed in further detail later in connection with FIG. 5. It will be understood that in a given network, each unique transceiver should have its own unique PN ranging code.

Using the pseudorange measurement, the second node 104 can calculate the distance to the first node 102 and adjust the timing of WB pulses 112 sent from a transmitter 114 of the second node 104 to a receiver 116 of the first node 102. In the illustrated embodiment, the timing of the WB pulses 112 is adjusted by the transmitter 114 such that the pulses arrive at the first node 102 within an expected time window to which the first node 102 is already synchronized. This permits the receiver to sample in relatively narrow windows to receive the UWB or WB pulses.

The first node 102 and the second node 104 can repeatedly communicate to further improve or update pulse timing, to update range calculations, and the like. In one embodiment, a node further communicates timing errors perceived by the node and provides these timing errors for updates to the other node to further refine the precorrection. For example, a state estimation and filtering circuit 118 can calculate a range using a pseudorandom noise (PN) ranging code, can receive a measured error 120 (illustrated as a dataflow) via a datalink, such as message carried by the WB signal 112, and the like. The "R," "V," and "A" in FIG. 1 indicate range, velocity, and acceleration state variables for updating the state estimation and filtering circuit 118. A variety of techniques can be used for the state estimation and filtering circuit 118. In one embodiment, a Kalman filter is used for the state estimation and filtering circuit 118. Other estimation techniques, such as least squares techniques, will be readily determined by one of ordinary skill in the art. It will be understood that the state estimation and filtering circuit 118 can be embodied in hardware, in firmware, in software, or by a combination of both hardware and software.

By exchanging range information and communicating position, nodes can be configured to cooperatively or collaboratively compute position. This cooperative position estimation can enhance the accuracy of the computed position of the nodes. In another example, a node is later denied access to one or more satellites, the disclosed techniques can advantageously maintain accurate positioning. For example, where a node corresponds to a moving car that traveling through a city with relatively tall buildings and hilly terrain, such as San Francisco, reception to a particular GPS space vehicle can be relatively sporadic. As will be understood by one of ordinary skill in the art, a conventional GPS receiver typically needs to track at least 4 GPS satellites in order to relatively accurately compute position. Embodiments of the enhanced GPS receiver described herein can advantageously continue to track relatively accurately with fewer than 4 GPS satellites by ranging to another nodes of known position. In another example, even where another node is not tracking at least 4 GPS satellites, such as where all the nodes of a network are denied GPS signals, the ranging and position estimation communication techniques advantageously reduce drift in other navigational aids, such as with inertial measurement unit (IMU) devices, and the node still positions itself more accurately than it would have otherwise without the ranging information and communication with other nodes. In one embodiment, the nodes use code division multiple access (CDMA) techniques to communicate on the same carrier frequency for WB and in a carrierless manner for UWB, and the network formed by the nodes is formed in an ad hoc manner coupling nodes that are in communication with each other.

Example of Front-End Integration of GPS and UWB

Figure 2:
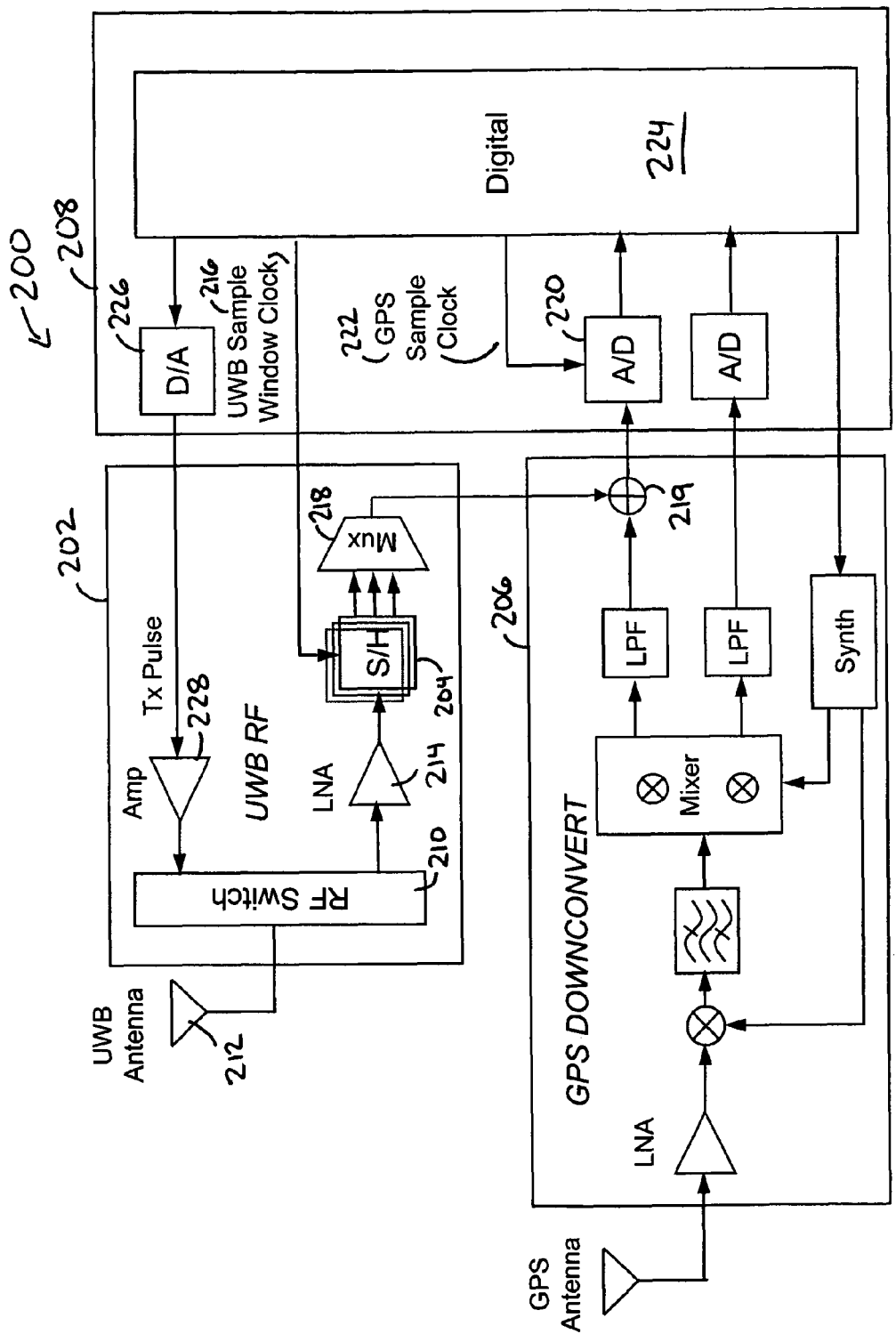
FIG. 2 illustrates a front end of a GPS receiver with an ultra wideband (UWB) radio frequency (RF) section with a sample and hold circuit in the receive path of the UWB RF section.

FIG. 2 illustrates a front end 200 of an enhanced GPS receiver with an ultra wideband (UWB) radio frequency (RF) section 202 with a sample and hold circuit 204 in the receive path of the UWB RF section 202. A GPS RF section 206 and a digital portion 208 of the front end 200 are also illustrated in FIG. 2. An RF switch 210 selects one of a transmit path or a receive path for the UWB RF section 202 for access to a UWB antenna 212.

When the RF switch 210 couples the receive path of the UWB RF section 202 to the UWB antenna 212, the UWB pulses from transceivers of other enhanced GPS receivers are received. A low noise amplifier (LNA) 214 amplifies the received signals and provides the amplified signal as an input to the sample and hold circuit 204. In the illustrated embodiment, the sample and hold circuit 204 captures 3 samples for a time window as illustrated by a UWB sample window clock signal 216. In one embodiment, the time window corresponds to a GPS system time already maintained by the enhanced GPS receiver and available to the front end 200.

The illustrated embodiment with the sample and hold circuit 204 advantageously permits the front end 200 of the enhanced GPS receiver to receive relatively short UWB pulses without using relatively large, expensive, high power consuming, high temperature devices such as high-speed flash analog-to-digital converters. In one embodiment, the sample and hold circuit captures samples centered around the desired time window of the UWB pulses. Since the timing of sample and hold circuit is centered around the desired time window of the UWB pulses, only a relatively few high speed samples need to be captured during each pulse period. A multiplexer (mux) 218 sequentially selects samples to be forwarded to the analog-to-digital converter. By spreading the samples over a GPS chip period, the multiplexer 218 performs a pulse expansion function that enables subsequent processing at a significantly reduced rate. In the illustrated embodiment, a summing circuit 219 is used to combine a UWB channel processing path and a GPS signal processing path to permit an analog-to-digital converter 220 to be shared. Code division multiple access (CDMA) techniques can be used to distinguish the signals in the digital domain. Since the sample and hold circuit 204 maintains the desired window of the amplified UWB signal, a GPS sample clock signal 222 used for a shared analog-to-digital converter 220 does not need to be synchronized to the UWB sample window clock signal 216. In one embodiment, separate analog-to-digital converters are used to convert the UWB signals and to convert the GPS downconverted signals.

When the RF switch 210 couples a transmit path of the UWB RF section 202 to the UWB antenna 212, the UWB RF section 202 transmits UWB pulses to other transceivers. In one embodiment, the pulses are precorrected to arrive at the desired transceiver in an expected time window, such as to a time window corresponding to GPS system time. A digital control circuit 224, which can be partially embodied with firmware or software executed by a microprocessor, determines the timing of a chip rate of the UWB pulses and determines the encoding of the pulses for UWB communication using a direct-sequence spread spectrum (DSSS) structure. In one embodiment, the DSSS corresponds to a pseudorandom noise (PN) ranging or bit code. For example, digital representations of a desired pulse can be loaded to a register, and then gated to a digital-to-analog converter 226 at appropriate times to generate an analog UWB pulse. One example of a shape for a monopulse will be described in greater detail later in connection with FIG. 9. The generation of UWB pulses will be described in greater detail later in connection with FIGS. 10, 12, 13A, and 13B. The generated UWB pulse is amplified by a transmitter amplifier 228 and broadcast via the UWB antenna 212.

DSSS Code Synchronization

As discussed earlier in connection with FIG. 2, one embodiment of the invention advantageously precorrects the timing of WB modulation or UWB pulses so that the received signal arrives at a receiver in an expected window. For example, the time can coincide with or be offset from GPS system time.

Prior to "acquiring" any DSSS signal, such as a GPS satellite signal, a WB signal encoded in DSSS, or a UWB signal, acquisition to the DSSS signal can be relatively difficult and time consuming. In one embodiment, the WB transceivers or UWB transceivers are configured to use a chip rate that is compatible with the chip rate of the GPS receiver, such as the chip rate of C/A code (1.023 MHz), M code, and/or P(Y) code (10.23 MHz). It should be noted that these code chip rates are illustrated for the purposes of example, and that code chip rates for future GPS systems and on future carrier frequencies can vary from the code chip rates currently used. Moreover, it should be noted that the code chip rate for Europe's planned Galileo positioning system can also vary from the code chip rates currently in use by the GPS system. The use of GPS code chip rates advantageously permits the same hardware used to acquire a GPS signal to similarly acquire the WB signal or UWB pulses. In one embodiment, a fast acquisition correlator or a parallel correlator is used to acquire both the GPS signals and the WB signals or UWB pulses. An example of a fast acquisition correlator for GPS is described in U.S. Pat. No. 6,466,958 to Van Wechel, et al., issued on Oct. 15, 2002, the entirety of which is hereby incorporated by reference herein. Of course, where rapid acquisition is not desired or available, slower acquisition techniques, such as relatively slow searches performed by a microprocessor, can be used.

Ultra Wideband (UWB) Processing Example

FIG. 3 illustrates another embodiment of a UWB pulse transceiver 302. The UWB pulse transceiver 302 is relatively simple and compact as no up-conversion circuits and no down-conversion circuits are required. The illustrated embodiment does not use a sample-and-hold circuit and instead, directly converts the received pulses to digital with a relatively fast analog-to-digital converter 304.

In one embodiment, the circuit illustrated in FIG. 3 corresponds to a configuration of a configurable transceiver which can effectively switch between the configuration illustrated in FIG. 3 for acquisition of a UWB signal and the configuration described earlier in connection with FIG. 2 after the UWB signal has been acquired.

Wideband (WB) Processing Example

FIG. 4 illustrates an example of a WB transceiver 402. It will be understood that a very broad range of modulation techniques can be used in the WB transceiver. In the illustrated example, relatively short pulses, such as pulses similar to UWB pulses, are directly modulated onto an RF carrier in quadrature and amplified. It will be understood that a variety of other techniques, such as direct baseband modulation techniques, bi-phase shift keying techniques, quadrature-phase shift keying techniques, and the like, can also be used.

Although the WB transceiver 402 circuitry is relatively more complex than the UWB pulse transceiver 302 example illustrated in FIG. 3, the signals of the WB transceiver 402 typically exhibit a relatively smaller percentage spectral content and a higher center frequency, which can be advantageous for compliance in environments with regulatory bodies, such as the Federal Communications Commission (FCC).

PN Ranging Code Implementation

Figure 5:
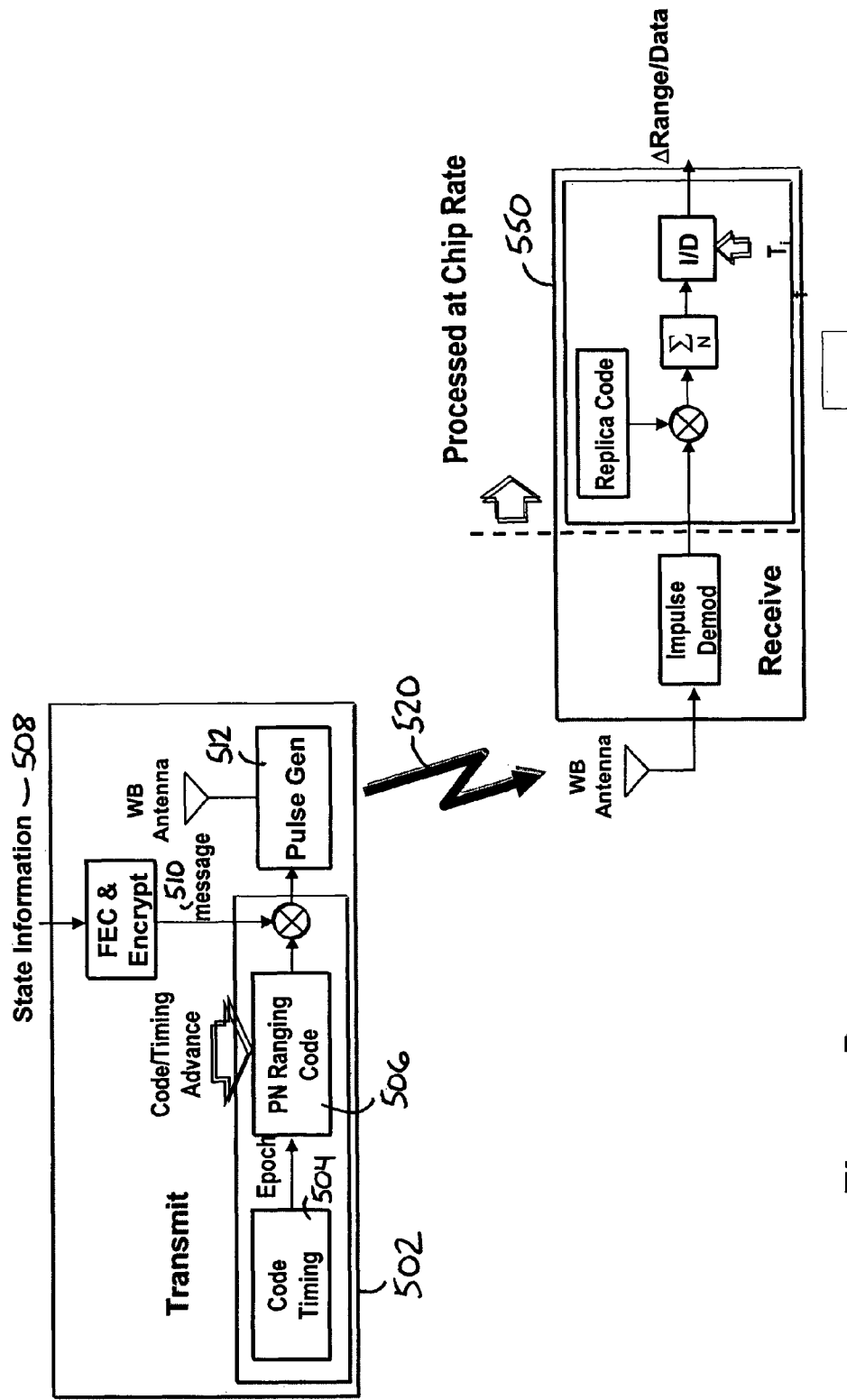
FIG. 5 is a block diagram illustrating an implementation of a relatively long PN code to resolve relatively long ranges with a WB or UWB transceiver (dual mode).

FIG. 5 is a block diagram illustrating dataflow for an implementation of a relatively long PN ranging code to resolve relatively long ranges with a WB or UWB transceiver (dual mode). While illustrated in the context of UWB, the skilled practitioner will appreciate that the principles and advantages described herein are also applicable to WB techniques. FIG. 5 illustrates a transmitter 502 and a receiver 550.

The transmitter 502 includes a code timing circuit 504. The code timing circuit 504 provides the initial code chip timing that will be used to synchronize the UWB pulses to an expected timing pattern. For example, the code chip timing can correspond to the GPS system time used for the GPS replica codes. This code chip timing (epoch) is used as a timing reference for the transmitted UWB pulses. In one embodiment, the transmitted UWB pulses are transmitted at the same chip rate as the chip rate for the GPS signal used for timing. However, it will be understood that related chip rates, such as multiples or sub-multiples of the GPS signal chip rate can also be used and still provide the benefit of providing pulses that arrive at the receiver within expected time windows.

A PN ranging code generation circuit 506 is timed by the code timing circuit 504. In one embodiment, the timing of the code chips for the PN ranging code generation circuit 506 are adjusted to arrive at the receiver within the expected time windows. In one embodiment, the PN ranging code generation circuit 506 is further configured to accept inputs from a control, such as a microprocessor, that shift, such as advance, the position along the code that is transmitted to align the UWB code with a GPS code. For example, where the UWB code is relatively long, such as a week long, one embodiment synchronizes the start of the UWB PN ranging code to coincide with the start of a GPS code, such as the week long P(Y) code. It will be understood that such synchronization should be referenced to GPS system time, which should be available in a GPS receiver.

The PN ranging code can also be modulated relatively slowly by state information 508 or other data in a similar manner with which a GPS satellite modulates a navigation message on the P(Y) code or the C/A code. The state information 508 can include forward error correction (FEC) code and can further be encrypted. In one embodiment, turbo product codes are used for the forward error correction codes. It will be understood that a resulting message 510 can vary in bit rate due to the inclusion of extra bits for forward error correction and/or for encryption. The message 510 can be modulated in a very broad range of frequencies. In one embodiment, the message 510 is modulated at 50 Hz such that the message 510 can be received and demodulated using integrate-and-dump (I/D) circuits that are configured to receive the GPS navigation message. This advantageously permits such integrate-and-dump circuits to be shared between GPS receiver circuits and UWB or WB circuits.

The modulated symbols are provided as an input to a pulse generator 512, and the UWB pulses are transmitted. The symbols can correspond to a bitstream of zeroes and ones. The pulse generator 512 can correspond to a digital-to-analog converter, which is gated at the appropriate times as will be described in greater detail later in connection with FIGS. 12, 13A, and 13B, to generate the pulses for the symbols.

The state information 508 can include, for example, a position of the transmitter 502 as calculated by a GPS measurement and/or inertial measurement, data regarding other transceivers that may be present in an ad hoc network, and the like.

The transmitted pulses 520 are received as indicated by the receiver 550. The receiver 550 demodulates the impulses, such as with a cross-correlation circuit. In one embodiment, the UWB bits are processed at a GPS system time rate, multiple, or sub-multiple thereof. The receiver 550 further aligns a replica PN code to determine pseudo range, and demodulates the state information with integrate-and-dump circuits. The code offset between the received code and the replica PN code can be used to determine a delta range or pseudorange between the transmitter 502 and the receiver 550.

The timing of the integration and dump circuits will vary depending on the data rate of the message. Where the data rate is the same as the GPS navigation message, the integrate-and-dump circuits can use the same 20 millisecond (ms) timing used in a GPS receiver to extract the navigation message. The message can then be decoded by forward error correction decoders and decryption circuits, as applicable. The message can be used for a variety of purposes. For example, the message can include information relating to communicate an absolute position measurement via GPS measurement or other measurement, such as an inertial measurement unit (IMU) measurement, to communicate a destination or a change to the destination, to communicate timing offsets used, and the like.

Figure 6:
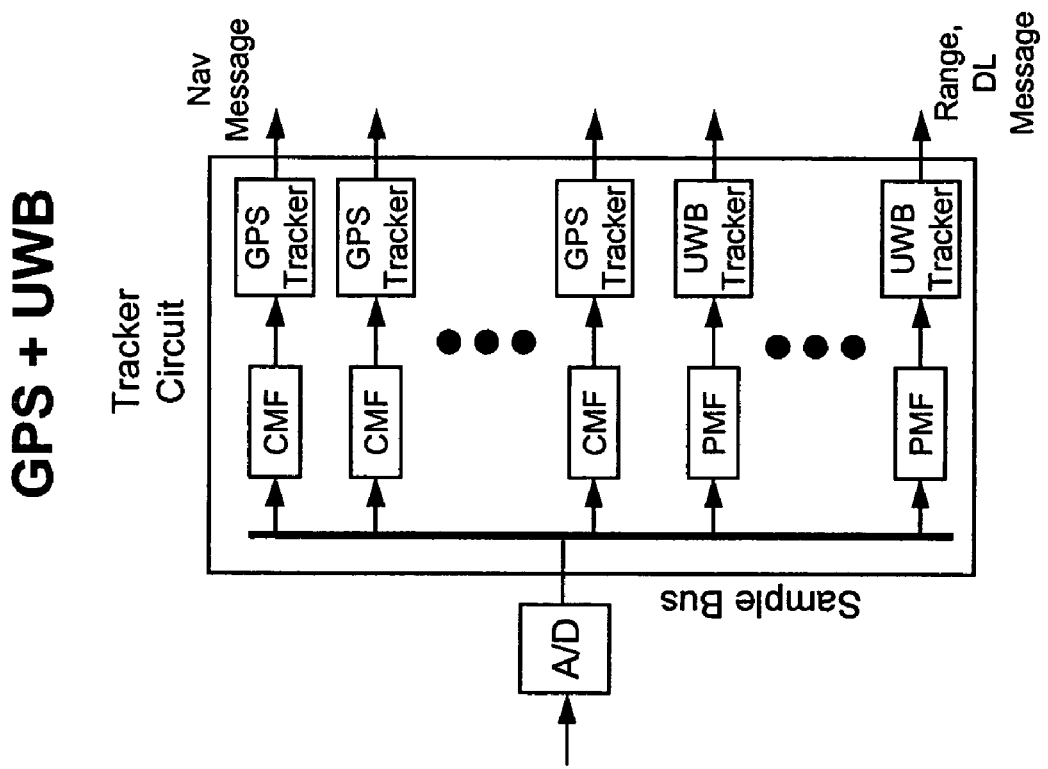
FIG. 6 is a schematic diagram of a code tracker adapted to track GPS messages and UWB messages.

FIG. 6 is a schematic diagram of a code tracker adapted to track GPS messages and UWB messages. In one embodiment, the same circuit is used for a GPS code matched filter (CMF) and a UWB pulse matched filter (PMF). It will be understood that the replica code used in the PMF should correspond to the codes used for UWB or WB modulation. The GPS tracking circuits can also be reused for UWB or WB tracking, as discussed in greater detail in connection with FIG. 7.

Code Tracking

Figure 7:
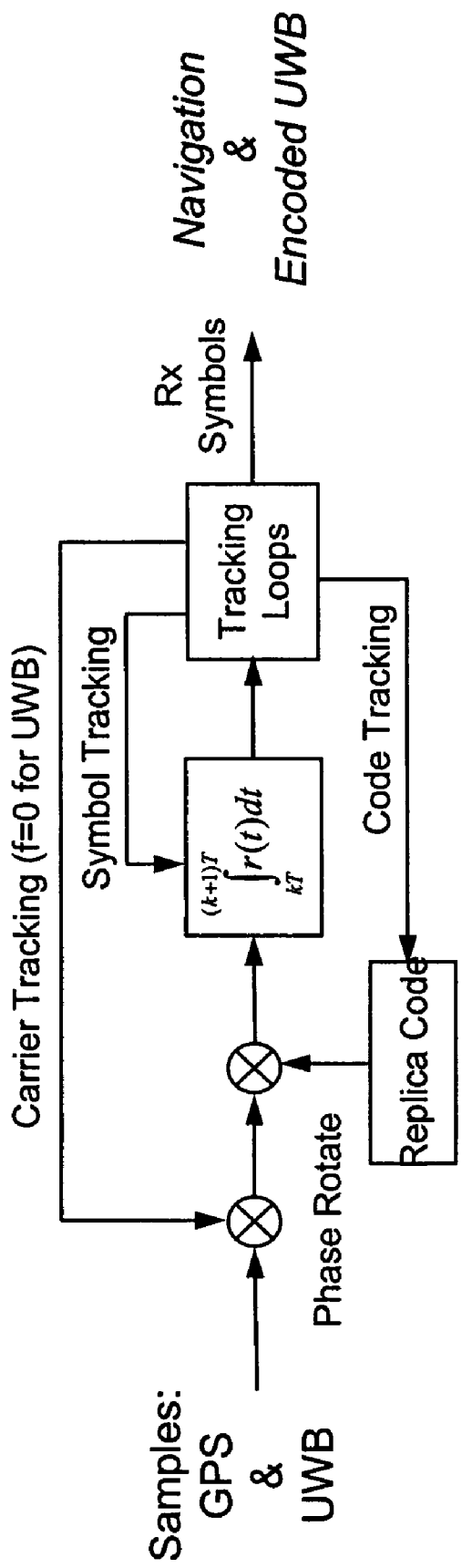
FIG. 7 illustrates a symbol tracking loop and a code tracking loop that can be used to receive GPS-like codes for pseudo-range measurements and a symbol tracking loop that can be used to decode messages.

FIG. 7 is a schematic diagram of a code tracker adapted to track GPS messages and UWB messages (dual mode or tri mode). FIG. 7 illustrates how the same code tracker can be used to track codes for either GPS signals or for UWB or WB ranging signals. A carrier tracking loop is typically implemented with a phase-locked loop (PLL). In one embodiment, the carrier tracking loop can be reused from a GPS carrier tracking loop with changes to carrier frequency and the like. It will be understood that a carrier tracking loop is not required for UWB. A code tracking loop is used to determine pseudorange measurements. It will be understood that the replica code used in the code tracking loop can vary depending on the intended range for which ranging is desired for the UWB transceivers. Without a PN code, the unambiguous range will approximately correspond to the period of the chip rate, e.g., about 100 feet for the 10.23 MHz P(Y) code chip rate. A symbol tracking loop used in an integrate-and-dump filter decodes messages such as the GPS navigation message. For the GPS navigation message and for UWB or WB messages at the same 50 Hz rate, the integration period should be about 20 ms. However, other data rates can be used. It will be understood that the data rate can vary in a broad range and can be determined by signal to noise ratios, which in turn can vary on transmitter power, on distance, and the like. For example, where the UWB or WB communication is to travel relatively large distances, such as distances between geosynchronous satellites, the message rates should be relatively low. In one embodiment, the message rates can be configured to vary from about 50 Hz to about 400 kHz, with integration periods of about 20 ms to about 2.5 microseconds (μs).

Impulse Modulation

Figure 8:
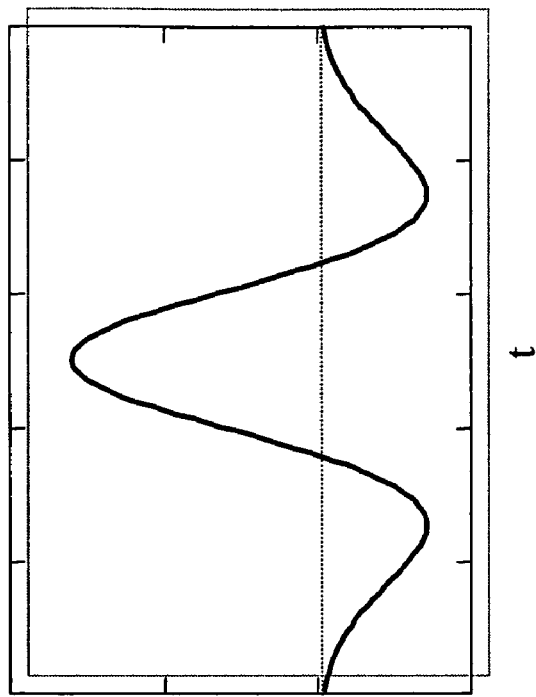
FIG. 8 illustrates an example of a monopulse useful for UWB or for modulation on WB.

FIG. 8 illustrates an example of a monopulse useful for UWB or for modulation on WB. It will be understood that the transmitting and receiving antennas, as well as any obscurations through which a monopulse passes, can significantly vary the actual shape of the monopulse. A very wide range of types or shapes of monopulses can be used. For example, the illustrated monopulse can correspond to a pulse with a pulse shape approximately defined by a Hermite polynomial with a number of zero crossings n equal to 2 (n=2). In another example, a pulse known as a "doublet," which can correspond to a pulse with a shape approximately defined by a Hermite polynomial with n=1, will be described later in connection with FIG. 11.

Figure 9:
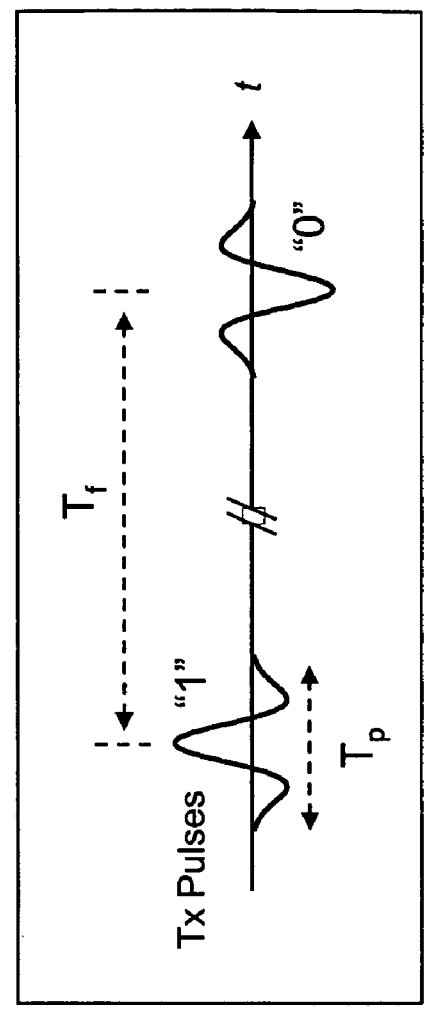
FIG. 9 illustrates an example of a first monopulse used to indicate a logic "1" and a second monopulse used to indicate a logic "0."

FIG. 9 illustrates an example of a first monopulse used to indicate a logic "1" code symbol and a second monopulse used to indicate a logic "0" code symbol. In the illustrated example, the phase of the monopulse indicates the state of the desired code symbol. It will be understood that with DSSS, multiple code symbols will be used to encode a data bit. These pulses (code symbols) can also be preceded by reference pulses that do not carry data. These reference pulses are used to assist the receiver to accurately detect the pulses (code symbols) that carry data, a technique which will be described in greater detail later in connection with FIG. 16.

Figure 10:
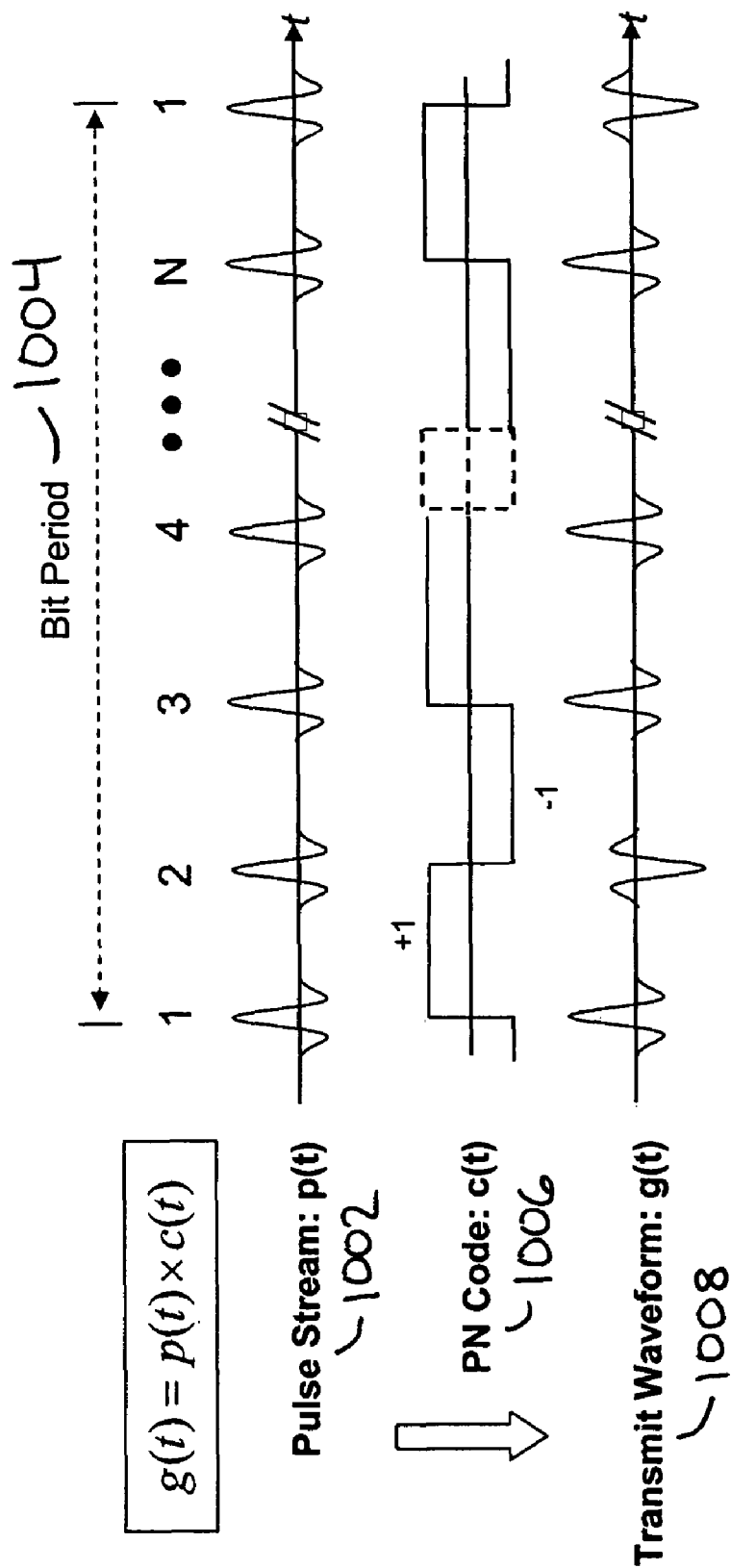
FIG. 10 illustrates a pulse stream of monopulses modulated by a pseudorandom noise (PN) code.

FIG. 10 illustrates a stream of monopulses modulated by a pseudo random noise (PN) code. For clarity, the pulse streams of FIG. 10 are drawn without reference pulses. A first pulse stream 1002 illustrates the timing of the pulses. In one embodiment, the timing of the pulses coincides with the timing of GPS system time. Multiple pulses of the first pulse stream 1002 define a bit period 1004. An example of a PN code 1006 is also illustrated. Where ranging is also desired, the PN code 1006 can also correspond to a PN ranging code. A transmit waveform 1008 illustrates how a stream of monopulses can represent the PN code 1006. When broadcast, the monopulses of opposing polarity exhibit differing polarizations, which are then detected at the receiver.

In addition, the transmit waveform 1008 can further be modulated on a relatively slow time scale to carry data in a manner similar to the modulation of the navigation message by the GPS system. This data can be decoded by the receiver using coherent integration techniques.

Receiver Windowing

Figure 11:
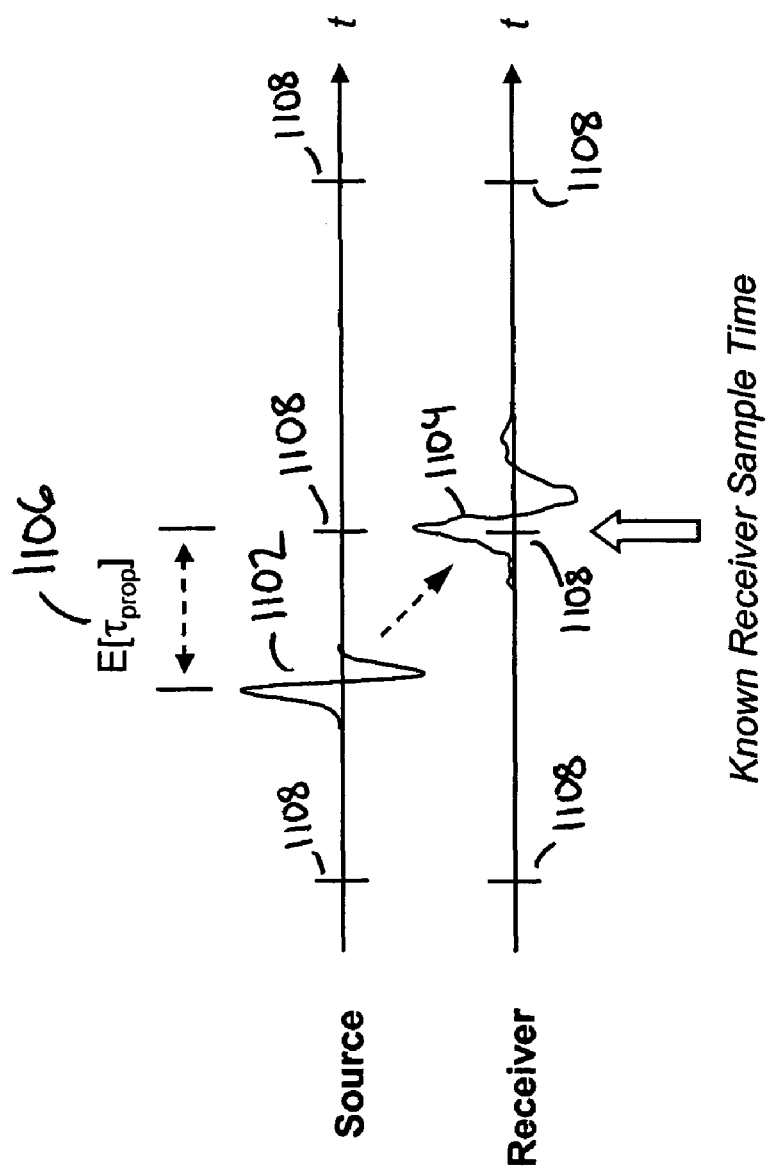
FIG. 11 illustrates an example of propagation delay and signal distortion for a pulse from a transmitter to a receiver.

FIG. 11 illustrates an example of propagation delay and signal distortion for a pulse from a source or transmitter to a receiver. A first waveform 1102 represents a pulse as it is amplified by a transmitter. The pulse illustrated in FIG. 11 is known as a "doublet," and can have a shape approximately corresponding to a Hermite polynomial with n=1. It will be understood that the principles and advantages described are also applicable to other pulse shapes and also to WB pulses modulated onto carrier waves. The pulse propagates through an antenna of the transmitter, travels through a space, which can include air, vacuum, walls, and the like, and is received by the an antenna of the receiver. A second waveform 1104 represents the pulse as it is received.

The pulse travels through space at a finite rate, which is approximately the speed of light, and the pulse is received at the receiver after a propagation delay 1106 that is approximately proportional to the distance traveled. For example, the propagation delay 1106 is approximately the distance traveled divided by the speed of light.

As drawn in FIG. 11, the second waveform 1104 is typically distorted from the first waveform 1102 due to distortion from the antennas and from obscurations that may be encountered as the pulse travels through a medium. For example, depending on the application, a pulse may travel through the walls of a building, a nose cone of an airplane, a plasma bubble in an atmospheric layer, and the like. These mediums can also distort the shape of the pulse.

Tick marks 1108 on the axes indicate timing (not to scale). In one embodiment, the source and the receiver for the UWB pulses are both already aligned to a common timing source, such as to GPS system time. Advantageously, as will be discussed later in connection with FIGS. 14 and 15, the source transmits the pulse such that it arrives at the receiver within an expected window, such as about the same time as edges or boundaries of a GPS system time clock signal. Thus, as illustrated in FIG. 11, the second pulse waveform 1104 is aligned with one of the tick marks 1108. It will be understood that in another embodiment, the window can also be related to a common timing via a predetermined offset. The timing adjustment performed by the source to align the pulse to an expected window is referred to herein as "precorrection."

In one embodiment, the timing precorrection is performed by maintaining a relatively high speed system clock, such as a clock in the high gigahertz (GHz) range, and using counter circuits and the like to trigger the generation of the pulse at the appropriate time. Disadvantageously, relatively high speed clocks and counter circuits consume relatively large amounts of power, thereby limiting battery life in portable devices, and can occupy considerable chip area, thereby increasing cost. Another benefit to windowing is that when the receiver is using windowing, noise and other interference arriving at times other than the window are ignored, thereby decreasing the susceptibility to interference.

It will be observed that an enhanced GPS receiver with both GPS and UWB or WB can later be denied reception to one or more GPS satellite signals, such as when, for example, a car with the enhanced GPS receiver drives into a canyon. In this situation, the cooperative ranging techniques that will be discussed later in connection with FIGS. 14 and 15 can be used to maintain the timing of the UWB pulses or WB modulations to within an expected window at the receiver.

Timing Precorrection

Figure 12:
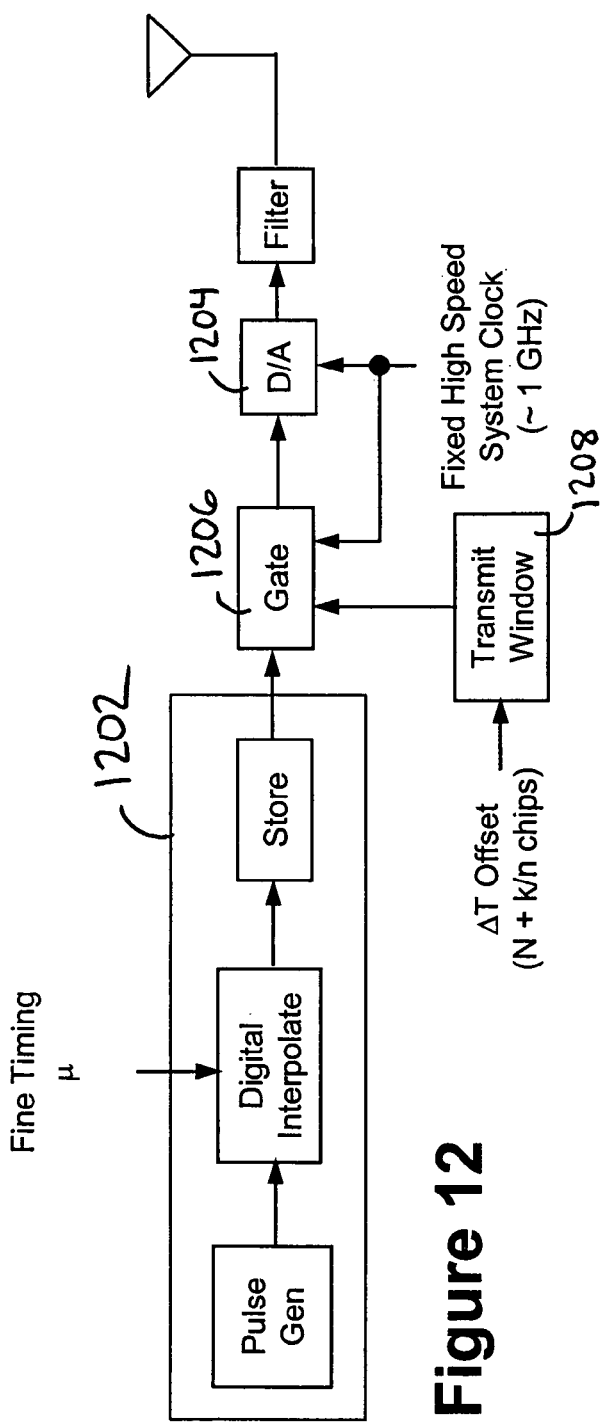
FIG. 12 illustrates a block diagram of a timing circuit to adjust the timing of a pulse by selecting samples of an oversampled pulse to shift the phase of the pulse.

FIG. 12 illustrates a block diagram of an efficient timing circuit that shifts the phase of a pulse to adjust the timing of the pulse. As described earlier in connection with FIG. 11, a relatively fast clock can be used and the pulse can be transmitted at a relatively precise time. The technique illustrated in FIG. 12 obviates the need for a relatively fast clock and instead, advantageously adjusts the shape of the pulse, thereby changing the phase of the pulse and the resulting apparent time that the pulse is sent and received. In one embodiment, the timing circuit uses a relatively fixed system clock and does not use a relatively high speed clock with relatively small clock periods to directly offset a pulse.

Figure 13B:
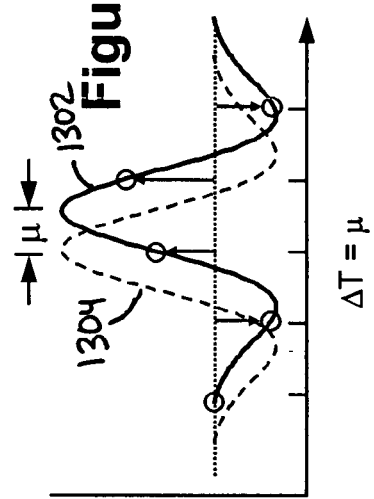
FIG. 13B illustrates an example of delaying a monopulse with respect to a reference time by selecting appropriate samples to generate the oversampled pulse.
Figure 13A:
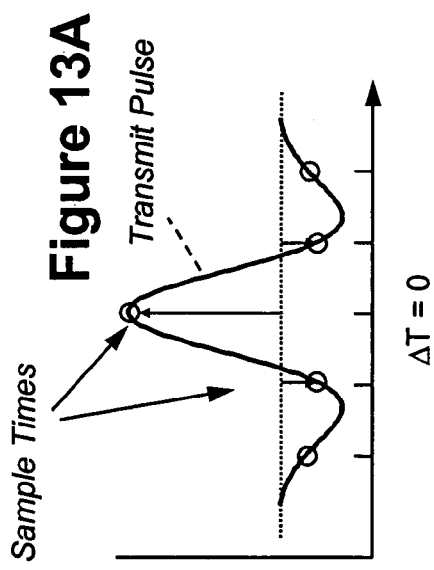
FIG. 13A illustrates a monopulse without a phase adjustment and an overlay of a calculated waveform for the monopulse.

While illustrated in the context of precorrecting the timing of UWB pulses, the illustrated timing circuit can also be used to precorrect the timing of WB pulses, which are then modulated onto an RF carrier. FIGS. 13A and 13B will also be used to describe the operation of the circuit illustrated in FIG. 12.

The circuit includes a memory 1202, such as a ROM, PROM, EPROM, EEPROM, FLASH, and the like, or in a RAM, to store an oversampled pulse waveform. The oversampled pulse waveform can be oversampled at virtually any convenient multiple, such as 2X, 4X, 8X, and the like (where X is the Nyquist rate for the pulse). Appropriate multiples will be readily determined by one of ordinary skill in the art.

It will be understood that the oversampled pulse waveform can be calculated and programmed during a manufacturing or calibration process and then stored in a non-volatile memory, such as in the ROM, can be calculated as part of an initialization process by an on-board processor and stored in RAM or series of registers, and the like. By oversampling, more datapoints than are typically used at a time are stored in the memory 1202. For example, the shape of the pulse can be calculated from a Hermite polynomial, and relatively more data points collected in the memory than typically used for pulses. The number of extra data points can vary within a wide range and can also vary depending on the degree of timing precorrection resolution desired. A fine timing factor $\mu$ indicates the extra samples available. In another embodiment, the data points from typical pulse shapes are interpolated to provide additional data points. The selection of the appropriate samples effectively shifts the phase for the pulse.

Sample points from the oversampled pulse waveform are stored in a gate circuit 1206, which can correspond to a relatively small and relatively high-speed register circuit accessible to a digital-to-analog converter 1204. In one embodiment, all of the sample points from the oversampled pulse waveform are stored in the gate circuit 1206. The gate circuit 1206 is configured such that the samples for a pulse of a particular offset can be relatively easily retrieved in sequence. In one embodiment, this is accomplished by rearranging address lines for the register circuit to sequentially access values for the pulse that are offset at code chip intervals.

A transmit window circuit 1208 receives an indication of a desired timing offset for precorrection. The source of the desired timing offset can be a microprocessor or other processor that is performing cooperative ranging to the receiver. In response to the timing offset, the transmit window circuit 1208 selects which samples of the pulse are to be used by the digital-to-analog converter 1204. This phase shift advantageously effectively time shifts the pulse without having to use a high-speed clock to shift the pulse in time, which can advantageously save power and avoid the high temperatures typically associated with high-speed circuits.

FIGS. 13A and 13B illustrate examples of how the timing circuit can effectively time shift the pulse by shifting phase. FIG. 13A illustrates a pulse that is not shifted with respect to the system clock. Values corresponding to the samples, as indicated by the circles on the waveform, are selected by the transmit window circuit 1208 and the system clock, and the samples are converted to analog by the digital-to-analog converter 1204. In a conventional timing adjustment circuit, these values would be transmitted, but at relatively small offsets away from the system clock intervals. For example, where an actual time shift is used, the fixed clock used for time shifting can correspond to a relatively fast clock, such as a clock in the several GHz range.

FIG. 13B illustrates an effectively time-shifted pulse. At the standard system time periods, the values corresponding to a time-shifted pulse are selected by the transmit window circuit 1208 and the system clock, as indicated by the circles a the solid waveform 1302 of FIG. 13B. A dashed waveform 1304 corresponds to the waveform with no offset that was previously illustrated in FIG. 13A. As illustrated in FIG. 13B, the solid waveform 1302 is desirably offset in time from the dashed waveform 1304. Advantageously, by changing the values used, rather than the timing used, the illustrated timing circuit can adjust the timing of the pulse without using a relatively high speed clock signal, thereby saving valuable power.

The illustrated timing circuit can advantageously be used to adjust the timing of a pulse for precorrection in the described enhanced GPS system. The skilled practitioner that the illustrated timing circuit can also be used to adjust the timing of pulses used in other circuits, such as circuits that are used for pulse communication with or without GPS.

Cooperative Ranging

Figure 14:
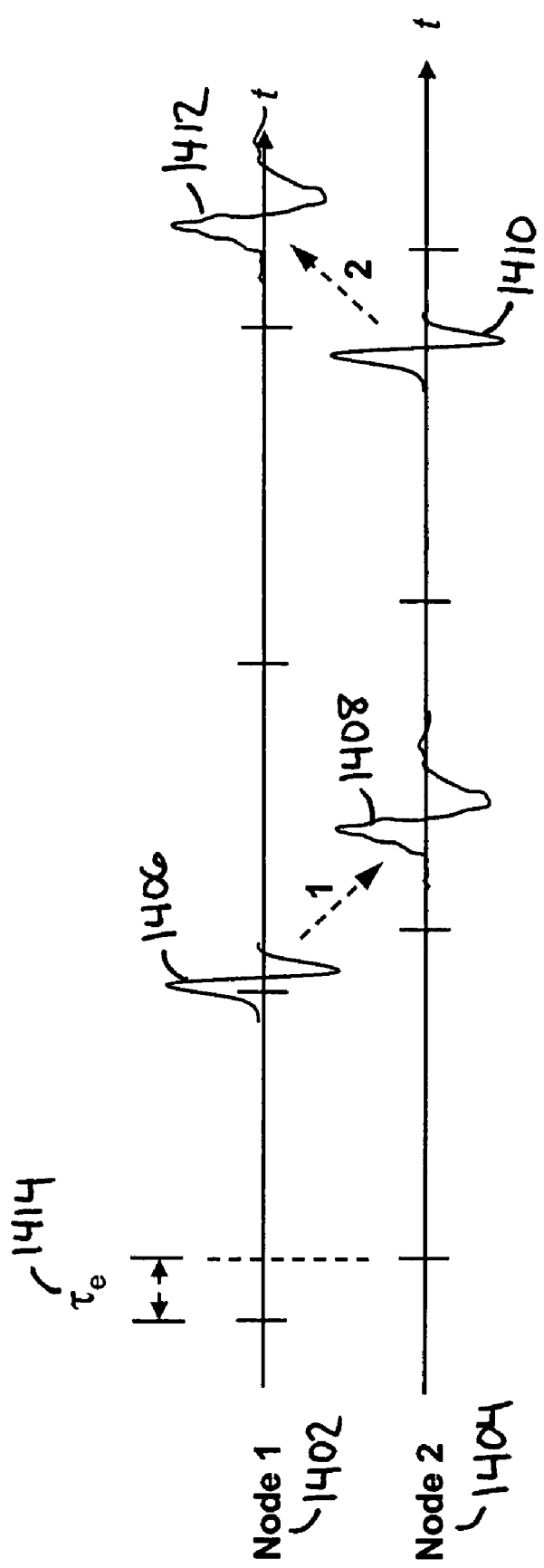
FIG. 14 illustrates UWB pulses exchanged between two nodes for cooperative ranging.

FIG. 14 illustrates UWB pulses exchanged between a first node 1402 and a second node 1404 (not to scale). It will be understood that with DSSS signaling, relatively many pulses (symbols) will be sent at a time in a symbol pattern. In FIG. 14, single pulses are illustrated for clarity for the purposes of illustrating the timing of UWB pulses for cooperative ranging. It will also be understood that the principles and advantages described with the UWB pulses are applicable to modulation of a carrier wave with a WB impulse. During the acquisition process, the nodes can initially use a fast acquisition correlator to search codes and time. Advantageously, fast acquisition correlator circuits can already be part of a GPS receiver in select applications.

With cooperative ranging, two or more nodes communicate with each other to "acquire" each other's DSSS signal and maintain acquisition of the signal so that acquisition with a correlator circuit is not needed after acquisition has been made. This advantageously permits the UWB or WB communications to be provided with relatively little extra hardware. At relatively short ranges and relatively small differences in speed between the nodes, after the signals are acquired, the cooperative ranging techniques advantageously permit nodes to further communicate with each other without using acquisition modes, thereby saving power and freeing acquisition circuits to acquire other signals, such as other UWB signals or GPS signals.

FIG. 14 illustrates four pulse waveforms relating to two pulses (representing series of pulses). Time increases along the axes from left to right. The first node 1402 transmits a first pulse, illustrated as a first pulse waveform 1406, which is received by the second node 1404, as illustrated by a second pulse waveform 1408. The second node 1404 transmits a second pulse, illustrated as a third pulse waveform 1410, which is received by the first node 1402, as illustrated by a fourth pulse waveform 1412.

In one embodiment, the first node 1402 and the second node 1404 use a common clock signal, such as GPS system time, as a timing reference. In an ideal case, there is no timing offset for this common clock signal between the two nodes. However, in a real-world environment, there is often a relatively small offset or drift between the two clock signals in separate nodes, which is represented by $\tau_e$ 1414 (not to scale). Hash marks along the axis represent code chip boundaries or other clock edge indications for the nodes. Although the hash marks for clock signal of the second node 1404 are illustrated as lagging the hash marks for the clock signal of the first node 1402, it will be understood that the timing offsets can vary in either direction and can also change over time.

Before acquisition, the first pulse can be sent at virtually any time. In the illustrated embodiment, the first pulse is sent at approximately the same time as the common clock as illustrated by the first pulse waveform 1406. The first pulse is received after a delay in time from a propagation delay $\tau_{prop}$ and a system delay $\tau_{sys}$. The propagation delay $\tau_{prop}$ is the time it takes for the pulse to travel from the first node 1402 to the second node 1404, and the system delay $\tau_{sys}$ is the time it takes for the signal to be processed by the receiver. It will be understood that the system delay $\tau_{sys}$ can vary within a receiver depending on whether the receiver is using an acquisition correlator, such as a fast acquisition correlator to receive the pulses or is using an autocorrelation circuit. The pulses are eventually aligned with the edges or boundaries of the common clock or other expected time windows in the receiving node such that autocorrelation can be used. In one embodiment, even though the acquisition phase may use an acquisition correlator, the system delay $\tau_{sys}$ used is the delay corresponding to an autocorrelation circuit. This delay can be stored in memory, can be measured while in operation, can be calibrated to match between the correlator circuit and the autocorrelation circuit, and the like.

With an offset or drift between the two clock signals, the second node 1404 perceives the pulse as arriving, with respect to its clock reference, after the propagation delay $\tau_{prop}$ plus the system delay $\tau_{sys}$ minus the clock drift $\tau_e$. In one embodiment, the PN code is also a ranging code, and the second node 1404 can determine the range to the first node 1402 based on the ranging code. With an acquired signal via, for example, a fast acquisition correlator, a message from the first node 1402 indicating an absolute position of the first node 1402, which GPS satellites are being observed by the first node 1402, and the like, can also be received.

At this point, the second node 1404 is not aware of the extent of clock drift $\tau_e$ between the two nodes. The second node 1404 sends out the second pulse at a time correcting for the propagation delay $\tau_{prop}$ plus the system delay $\tau_{sys}$ as indicated by the third pulse waveform 1410. In later communications, the second node 1404 can also correct for the clock drift $\tau_e$. The second pulse is received by the first node 1402 offset by the clock drift $\tau_e$ as indicated by the fourth pulse waveform 1412. Depending on the extent of the clock drift $\tau_e$, the second node 1404 may yet use an acquisition correlator to acquire the pulse. In one embodiment, the second node 1404 uses a ranging code to permit the first node 1402 to determine the range to the second node 1404. In addition, a relatively slow message can also be encoded by the second node 1404 in a manner similar to the encoding of the navigation message in a GPS system, and this message can be used to indicate the satellite code used for timing, the absolute position of the second node 1404, the timing corrections used (propagation delay, system delay, and clock offset, as applicable).

Having received the second pulse, the first node 1402 can now measure the clock offset $\tau_e$. The next set of pulses (not shown) can include timing corrections for propagation delay $\tau_{prop}$, system delay $\tau_{sys}$, and clock offset $\tau_e$, so that the next set of pulses arrive at the second node 1404 aligned with the common clock. The offset information can also be transmitted in a message encoded by the pulses. At this point, pulses can be received by relatively inexpensive and low-power windowing circuits, rather than expensive and power hungry fast acquisition correlator circuits. It will be understood that the nodes can continue to update timing corrections to further enhance timing accuracy and/or to update timing corrections for changes in propagation delay, offset changes, and the like. It should also be noted that system delays and clock offsets typically do not change very much over time, but that in many applications, the range between the nodes can change relatively quickly. In addition, the expected window can includes samples slightly beyond the edges or boundaries of the common clock, thereby accommodating jitter and timing changes over time, which can further be corrected when detected. In addition, the pulses can use PN ranging codes, thereby permitting the nodes to continue to update ranging and timing corrections relatively easily.

When multiple nodes are present, such as in an ad hoc network, the multiple nodes can be identified by using separately identifiable PN codes in a code division multiple access (CDMA) manner. This, permits, for example, the same carrier frequency to be shared for WB impulse modulation. Thus, the various nodes can communicate with each other simultaneously. Where transmission to more than one node at a time is desired, the individual WB impulse modulations can be combined as is performed in a cell phone base station, or the individual UWB pulses can be staggered according to the desired receiver. For example, after acquisition, the nodes can communicate timing offsets from the GPS system time to be used for particular nodes. The timing offset can be sent via a relatively slow message, such as the navigation message. This can permit one node to simultaneously communicate with a plurality of other nodes.

Autocorrelation Circuit

Figure 15:
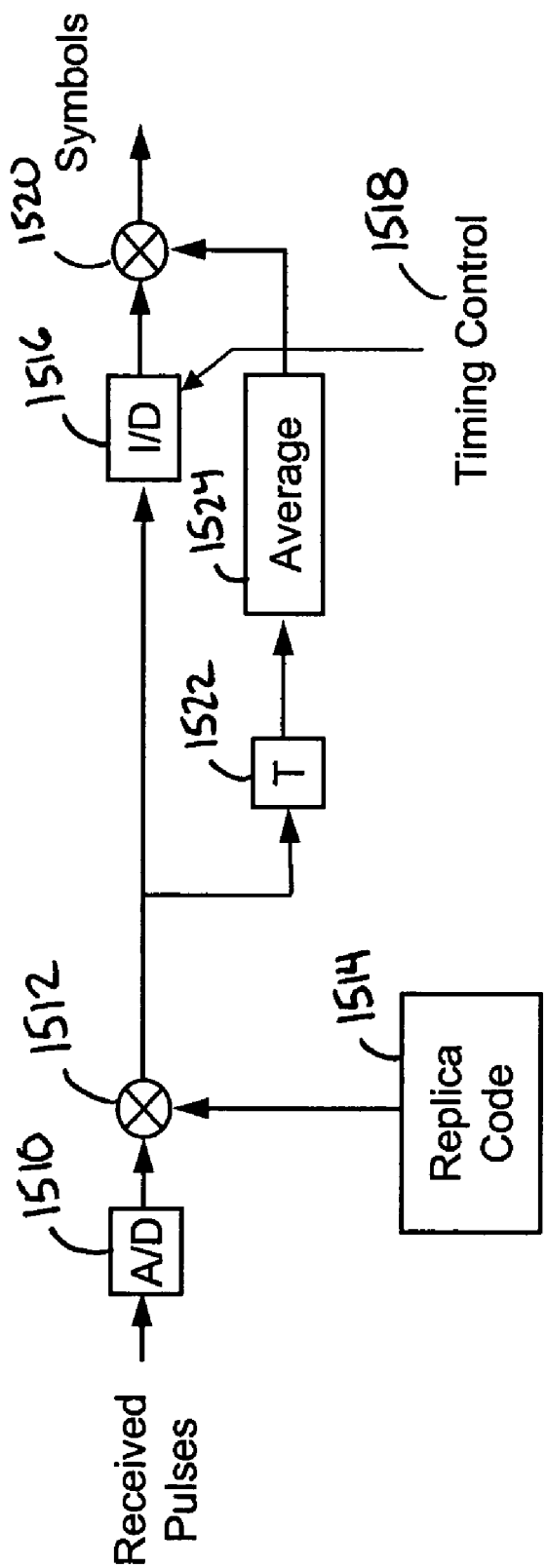
FIG. 15 illustrates an autocorrelation circuit to decode PN symbols.

FIG. 15 illustrates an example of an autocorrelation circuit 1500 that can be used to decode PN symbols from UWB pulses or from WB impulse modulation of carrier waves. After acquisition of the UWB pulses or WB impulse modulated carrier waves has been achieved, the autocorrelation circuit 1500 can advantageously be used to maintain acquisition in a relatively inexpensive, space-efficient, and power-efficient manner. In one embodiment, a fast acquisition correlator is used to acquire the UWB or WB modulated signal from another node. After the signal is acquired, a relatively simple circuit, such as the illustrated autocorrelation circuit 1500 can advantageously be used to maintain acquisition to the acquired UWB or WB modulated signal, thereby freeing up the fast acquisition correlator to acquire another UWB or WB modulated signal. This permits a relatively compact and power efficient receiver to communicate with multiple other nodes simultaneously.

The UWB pulses or WB modulated impulses are received by a front-end of a receiver, and are provided to the autocorrelation circuit 1500. For example, the output of the sample-and-hold circuit 204 of the UWB RF section 202 described earlier in connection with FIG. 2, or an output of the WB transceiver 402 described earlier in connection with FIG. 4, can be provided as an input to the autocorrelation circuit 1500.

Received pulses are provided as an input to an analog-to-digital converter 1510. For example, these received pulses can be retrieved from the sample-and-hold circuit 204 described earlier in connection with FIG. 2. A digital output of the analog-to-digital converter 1510 is provided as an input to a first exclusive-OR (XOR) gate 1512, where the output is combined with a data from a replica PN code 1514. It will be understood that the data from the replica PN code 1514 shifts over time. The output of the first XOR gate 1512 is provided as an input to an integrate-and-dump (I/D) circuit 1516 to match filter data carried by relatively slow modulation of the DSSS codes. A timing control signal 1518 controls the timing of the integrate-and-dump circuit 1516. For example, where the data messages are sent at the 50 Hz rate of the GPS navigation message, the timing control signal 1518 controls the integrate-and-dump circuit 1516 integration and dump period to about 20 milliseconds (ms). As described earlier in connection with FIG. 5, the data messages can be sent at a wide range of data rates depending on the signal to noise ratios available.

The output of the integrate-and-dump circuit 1516 is compared to a reference with a second XOR gate 1520 to detect phase shifts in the code. It will be understood that the reference can be stored in memory and retrieved. In the illustrated embodiment, transmitted reference pulses are used. When used, these reference pulses are averaged 1524 to improve the signal-to-noise ratio prior to cross-correlation 1520. These references pulses can be used in addition to or as an alternative to stored references. Advantageously, transmitted reference pulses are typically distorted by antennas, obscurations, and the like, in a similar manner as the message-carrying pulses would be distorted, thereby making correlation relatively more accurate.

The reference pulses can correspond to a pulse sent prior to the symbol pulse. A delay circuit 1522 delays the reference pulse to time align the integration of the reference pulse with the message-carrying pulses. In one embodiment, an averaging or integration circuit 1524 for the reference pulse is not controlled by the timing control signal 1518 as the reference pulse does not change phase (notwithstanding relative changes to antenna orientation). In one embodiment, the phase of the reference pulse corresponds to an unmodulated PN code, such as an unmodulated PN ranging code output of the PN ranging code generation circuit 506 described earlier in connection with FIG. 5, to keep the phase of the reference pulse relatively constant. It will be understood that in situations where the relative orientation of the source and receiver can change over time, such as, for example, where an airplane as a node rolls or a person as a node pivots, that the amplitude of the unmodulated PN ranging code can appear to change. However, it will also be understood that in the decoding of the message, that transient errors due to these relatively slow shifts due to physical or environmental effects can be compensated by forward error correction codes in the decoding of the message.

GPS and Supplemental Ranging

Embodiments include nodes with GPS that communicate with each other using UWB pulses or WB impulse modulated carrier waves. Advantageously, the UWB pulses or WB impulses can be used with ranging codes to determine range between nodes. This can be used in a variety of applications, such as the relatively precise alignment of multiple vehicles, such as the close alignment of automobiles traveling together in a smart highway for fuel economy, a convoy of vehicles traveling in a dusty environment or covertly at night, the precise guidance of tractors on farms for high yield, the precise alignment of groups of flying craft traveling together in formations, such as airplanes, unmanned vehicles, and the like.

In one example, the increased precision among nodes of a group is used to precisely arrange the nodes of the group to reach a destination in a relatively tight formation, such as one following immediately after the other, with relatively more precision than could be accomplished via GPS alone. In another example, the relatively precise alignment possible among multiple flying craft is used to, for example, align the craft to reduce a radar signature.

Enhanced GPS Accuracy

The GPS system provides relatively good accuracy of positioning. It will be understood that in a typical GPS system, the acquisition of four or more GPS satellite signals is needed to resolve positioning in a relatively unambiguous manner. Typically, with the P(Y)-code used and four or more GPS satellite signals received, a GPS receiver can provide positioning to within an uncertainty of between about 1 to 3 meters. While this level of performance is acceptable in many situations, there are situations, such as in traveling convoys, in which better performance is desirable.

In one embodiment, the nodes communicate with each other via a datalink to share the nodes' awareness of global positioning. For example, the nodes can transmit messages by modulating the PN code. The information shared among nodes can include, for example, positioning and velocity. This can provide a relatively rough measure of relative positioning.

A more precise measure of relative positioning is attainable when ranging to a sufficient number of nodes is available. The PN code can correspond to a ranging code, thereby permitting the nodes to determine ranging from other nodes. Without the assistance of any GPS, the number of nodes that may be needed to resolve ambiguities in relative position can be relatively high. In general, it can take at least 4 other nodes to resolve ambiguities when traveling in 3-dimensions. However, since an approximate relative position is typically available from GPS and the synchronization to a common time is also available from GPS, the number of nodes needed is typically less than would otherwise be expected. The number of other nodes needed can depend on a variety of factors, including the initial approximate relative positions known via GPS, where the nodes are positioned relative to each other, and the number of degrees of freedom involved, e.g., whether the nodes can travel in 3 dimensions or in 2 dimensions.

In one example, only 2 other nodes are needed to resolve ambiguities in 2 dimensions for relative positioning. For example, on relatively flat farmland, the positioning of tractors as nodes can be effectively analyzed as a 2-dimensional problem. A variety of techniques and combinations of techniques can be used.

For example, in a network of nodes with 3 nodes and with ranging known among each of the nodes, the ranges can correspond to sides of a triangle with the 3 nodes positioned at the vertices of the triangle. Simple geometry, such as the Law of Cosines, can be used to determine angles between nodes if desired. Advantageously, with relatively accurate ranging, the relative positioning can be known more precisely than a relative position calculated from absolute GPS positions. Additionally, it should be noted that ghost images from relative positioning are constructable, but these ghosts can typically be eliminated by knowledge of rough position via GPS positioning. In one example, all 3 of the nodes in the 3-node system also have GPS. A particular node can calculate its absolute position with GPS or by using the relative positioning to another node and the other node's absolute position. In one example, the various absolute measurements are combined into an aggregate absolute position, which is typically more accurate than an individual measurement due to an averaging out of biasing errors and random errors.

In another 2-dimensional example, for each range to a node, a node can determine that it is somewhere along a circle with a radius defined by the range, where a center for the circle corresponds to the node to which it has ranged. With ranges to two nodes, these corresponding circles intersect at two points. In many situations, the GPS absolute position, though not particularly accurate for ranging between nodes, is accurate enough to resolve the two-point ambiguity to one point so that ranging to only 2 other nodes can advantageously provide the desired relative positioning with the enhanced precision of the UWB or WB ranging. Additional nodes can also be used. It will also be understood that other geometrical relationships can be used calculate relative positioning. In addition, it should be noted that the appropriate techniques to use can also depend on which measurements are taken. For example, where each node ranges to the other nodes, the triangle geometry techniques can be used. In another example, where one node takes ranging measurements to a plurality of nodes and is unaware or does not use the ranging between other nodes, the intersection of circle techniques can apply.

Similar techniques and one or more additional nodes can be used for 3-dimensions. For example, four nodes in 3-dimensions form a tetrahedron (assuming the four nodes are not in one plane) rather than a triangle. In another example, the circle expands to a sphere in 3-dimensions. Ranging to one node resolves relative position to a sphere with a radius of the range. Ranging to two nodes resolves relative position to an intersection of two spheres, which is a circle. Ranging to three nodes resolves relative position to an intersection of three spheres, which is two points. Typically, since a rough estimate of relative position is already calculable via GPS, ranging to three or more nodes suffices to resolve relative position in 3 dimensions with the UWB or WB ranging techniques disclosed herein.

It will be understood that the relative ranging measurements do not need to be made by a node using the ranging measurements, but rather, can be made between two nodes and then shared with a third node of the network via a datalink.

In one embodiment, all nodes compute relative position of nearby nodes. It will be understood that the relative position can change over time, and that the ranging of the nodes can be performed repeatedly to keep the relative positions up-to-date.

When the relative positions of the nodes are relatively precisely known (more precisely known than via GPS), a collective estimate of the position of one or more of the nodes can be made using by combining the GPS positioning data and the relative positioning data from the UWB or WB range measurements. It will be understood that GPS positioning data can include one or both of absolute position and velocity. For example, a particular node can combine its own estimate of GPS position with the GPS positions of the other nodes and their relative positions to estimate a more accurate position. In one embodiment, the node averages these various measurements. Random errors in GPS position fixes are reduced as a result.

It will also be understood that GPS positioning data can be provided in a variety of ways. For example, in a convenient approach, the absolute position itself can be provided. However, other techniques, such as translation techniques can also be used to indicate absolute position. See, for example, U.S. patent application Ser. No. 10/255,855, filed on Sep. 26, 2002, titled "HYBRID TRANSLATOR IN A GLOBAL POSITIONING SYSTEM (GPS)," by Lloyd, et al., the entirety of which is hereby incorporated by reference herein.

Applicant has simulated the effects of combining these GPS measurements, and the simulations have shown an improvement in GPS position fixes by a factor of about $\sqrt{N}$, where N is the number of nodes in the network providing range and positioning data.

A variety of techniques can be used to combine the GPS measurements. In one embodiment, the nodes compute an estimate of clock bias errors, such as, for example, comparing clock bias with respect to an averaged clock bias or a median clock bias computed for the group. An example of a clock bias $\tau_e$ 1414 was described earlier in connection with FIG. 14. In one embodiment, the computed clock bias errors are used to weight the relative contributions of position estimated from another node's position and the relative positioning to the other node. In another embodiment, simple unweighted averaging techniques are used to combine a new estimate for the position of a node based on its GPS readings and the GPS positions of other nodes and the relative positioning to the other nodes. Estimation techniques, such as Kalman filtering techniques, can also be used. Other applicable techniques will be readily determined by one of ordinary skill in the art. Advantageously, not only can vehicles align themselves in a precise manner using the efficient ranging techniques disclosed herein, but the vehicles can also position themselves more accurately by sharing GPS position, and ranging and/or relative position information. This advantageously provides cooperative navigation in a more accurate manner than individual navigation.

Supplemental Navigation Signals with Denial of GPS Signals

Further advantageously, when a network of nodes has computed relative positions, a node of the network can compute absolute position without GPS. For example, a node that is denied GPS signals by, for example, interference from a radio source, a malfunction in a GPS receiver, traveling into an area with an obstruction or an obscuration, and the like, can advantageously calculate absolute GPS position using the GPS location of one or more other nodes in the network and the relative position to the one or more other nodes. This can provide GPS coverage in areas where GPS coverage was previously unattainable. For example, vehicles traveling in difficult terrain, such as the hills and buildings of San Francisco, can advantageously benefit from increased coverage. In another example, a plurality of nodes can be used outside a building, such as in an emergency response vehicle, and the nodes can be worn by rescue workers to provide positioning inside a building where GPS coverage is typically unattainable. Of course, when the GPS receiver is no longer denied GPS signals, the node can transition back to using the GPS signals received by the node.

Ranging and relative positioning is still beneficial when none of the nodes of a network is receiving enough GPS signals for positioning. For example, a group of cars can be traveling in a canyon that denies reception to the typical 4 or more satellites needed to position via GPS. In another example, an interference source can deny access to GPS signals to the nodes of a network. Without access to GPS signals, the nodes of the network can still maintain ranging and relative positioning using UWB pulses or WB impulse modulation.

Advantageously, one or more of the nodes may include an auxiliary navigation device, such as an inertial measurement unit (IMU). The navigation data provided by the IMU can be shared among the nodes so that even nodes without a form of auxiliary navigation can still compute an update to positioning based on the position calculated by the EMU of the node with the IMU and the relative positioning to the node.

One of ordinary skill in the art will appreciate that over time, the position calculated from an IMU will tend to drift due to bias errors. In another example, where relatively many of the nodes include IMUs, the absolute positioning calculated from the IMU measurements is shared among the nodes as described earlier in connection with sharing GPS positioning among nodes. This sharing of absolute positioning of other nodes, combined with relative positioning of the nodes, permits a node to compute a position that is an aggregate of the various nodes. For example, an average position can be computed. Advantageously, an individual IMU's bias error can typically be diluted via combination with measurements from other nodes with IMUs, thereby effectively increasing the accuracy and reducing the drift associated with an absolute position estimate based on an IMU measurement.

Space Applications

Figure 16:
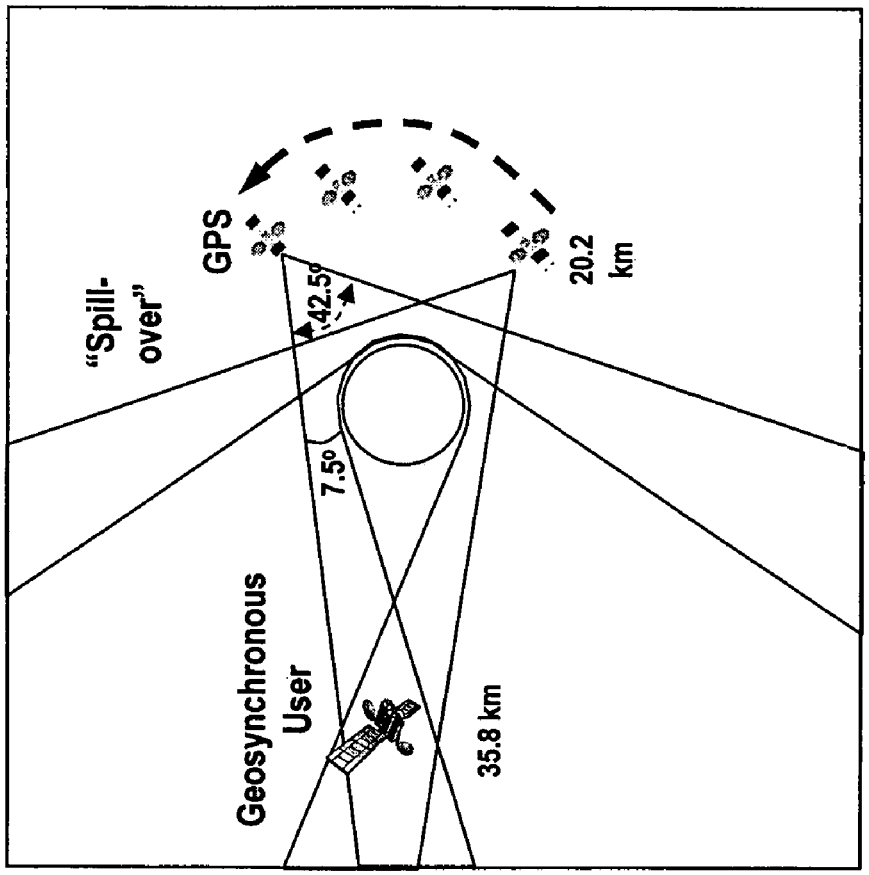
FIG. 16 illustrate a use of GPS positioning for a geosynchronous satellite.

In one embodiment, the foregoing techniques are used to determine the positioning of a node in outer space, such as the positioning of a geosynchronous satellite. FIG. 16 illustrate a use of GPS positioning for a geosynchronous satellite. Conventional GPS techniques are typically not applicable to determine a position of a geosynchronous satellite. The orbit of a GPS satellite is relatively low at approximately 20,200 kilometers above sea level. By contrast, the orbit of a geosynchronous satellite is relatively high at about 35,790 kilometers above sea level. As the antenna of a GPS satellite points "down" toward Earth, the signals from nearby GPS satellites are typically not receivable by a geosynchronous satellite. Rather, the GPS satellite signals that are typically receivable are from far away GPS satellites on the far side of the Earth that are not occluded by the Earth itself. These GPS satellite signals are greatly attenuated by the extra distance traveled and the movement of the GPS satellites, and as a result, reception to these signals is relatively sporadic and is frequently less than 4 satellites. However, when combined with relative positioning via UWB pulses or WB impulse modulation, the relative positioning of other nodes, at least one of which has GPS, can be used to ascertain absolute position for the node.

In another embodiment, the foregoing techniques are used for the guiding or positioning of a node, such as a relatively high-performance rocket or other launch platform used to carry a geosynchronous satellite into orbit. When a high performance space vehicle travels with high velocity, a plasma sheath is typically formed around the nose cone. This plasma sheath can dramatically attenuate GPS signals, thereby limiting the number of GPS satellites that can be received. Where multiple nodes are traveling together, the relative positioning of the nodes can advantageously be used to share the GPS position of one or more nodes that are receiving GPS, to share estimates of positioning via IMU to reduce IMU drift, and the like.

Network Configuration

In one embodiment, the nodes of a network determine how to communicate amongst themselves in a desired manner based on the relative positioning of the nodes. This includes optimal data routing amongst the nodes, including non-navigational data, based on each node's knowledge of the positions and velocities of other nodes. In one embodiment, a node communicates with the nodes of the network that are closest, i.e., shortest path, to the node.

In another embodiment, a node communicates with the nodes of the network that are estimated to provide relatively good navigation performance, i.e., relatively good relative positioning based on, for example, dilution of precision (DOP). In one example, the node communicates with the nodes of the network that are estimated to provide optimal good navigation performance.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of timing the transmission of symbols of a local direct-sequence spread spectrum (DSSS) signal, wherein the local DSSS signal is sent from a first transceiver to a second transceiver, the method comprising:
   receiving at least sporadically, one or more satellite navigation signals in the first transceiver such that the first transceiver is synchronized with satellite system time;
   receiving, at least sporadically, one or more satellite navigation signals in the second transceiver such that the second transceiver is synchronized with satellite system time; and
   under control of a processor of the first transceiver, modulating or pulsing symbols of the local DSSS signal such that the symbols are transmitted by a transmitter and antenna of the first transceiver with actively precorrected timing so that when the symbols of the local DSSS signal are received in the second transceiver that is separate from the first transceiver, the symbols are received with substantially zero offset relative to boundaries of a clock signal based on satellite system time even when a distance between the first transceiver and the second transceiver changes;
   generating the clock signal based on satellite system time in the second transceiver;
   using one or more boundaries of the clock signal as timing references for sampling windows wherein the sampling windows are aligned with substantially zero offset relative to the boundaries of the clock signal based on satellite system time; and
   using the sampling windows to sample the DSSS signal.

2. The method as defined in claim 1, wherein the clock signal is Global Positioning System (GPS) system time, and the DSSS signal is an ultra wideband (UWB) signal.

3. The method as defined in claim 1, wherein the clock signal is Global Positioning System (GPS) system time, and the DSSS signal is an RF carrier wave modulated by wideband (WB) impulses.

4. The method as defined in claim 1, wherein the DSSS signal corresponds to a pseudorandom noise (PN) ranging code, further comprising using the PN ranging code to determine a range to a source of the DSSS signal.

5. The method as defined in claim 1, wherein the DSSS signal corresponds to a pseudorandom noise (PN) ranging code, further comprising modulating the PN ranging code to encode a message.

6. The method as defined in claim 5, wherein the encoded message includes an absolute position of a source for the DSSS signal.

7. A method of timing the transmission of symbols of a local direct-sequence spread spectrum (DSSS) signal, wherein the local DSSS signal is sent from a first transceiver to a second transceiver, the method comprising:
   providing the first transceiver, wherein the first transceiver is capable of adjustably offsetting symbols of the local DSSS signal relative to satellite system time when transmitted by the first transceiver;
   providing the second transceiver, wherein the second transceiver is separate from the first transceiver;
   receiving at least sporadically, one or more satellite navigation signals in the first transceiver such that the first transceiver is synchronized with satellite system time;
   receiving, at least sporadically, one or more satellite navigation signals in the second transceiver such that the second transceiver is synchronized with satellite system time; and
   under control of a processor of the first transceiver, modulating or pulsing symbols of the local DSSS signal such that the symbols are transmitted by a transmitter and antenna of the first transceiver with actively corrected timing so that when the symbols of the local DSSS signal are received in the second transceiver, the symbols are received with substantially zero offset relative to boundaries of a clock signal based on satellite system time even when the first transceiver and the second transceiver are moving relative to each other.

8. A method of timing a local direct-sequence spread spectrum (DSSS) signal, wherein the local DSSS signal is sent from a first device to a second device, the method comprising:
   receiving one or more satellite navigation signals in the first device;
   receiving one or more satellite navigation signals in the second device;
   sending symbols of the local DSSS signal from the first device to the second device such that the symbols of the local DSSS signal are substantially time-aligned with a predetermined offset from satellite system time, wherein the local DSSS signal includes a pseudorandom noise (PN) ranging code;
   acquiring the local DSSS signal in the second device with a correlator circuit;
   computing a first offset in the local DSSS signal relative to the satellite system time; and
   sending a second local DSSS signal from the second device to the first device, wherein the second local DSSS signal is deliberately offset by the second device from the satellite system time such that a second offset in timing in the second local DSSS signal relative to the satellite navigation signal as received in the first device is less than the first offset.

9. The method as defined in claim 8, further comprising determining a range from the second device from the PN ranging code and using the range to compute a propagation delay.

10. A method in a first node of determining range to a second node, the method comprising:
    at least sporadically receiving satellite ranging codes in the first node so that the first node is synchronized to satellite system time;
    receiving ultra wideband (UWB) pulses transmitted from the second node, wherein the second node is also synchronized to satellite system time, wherein the UWB pulses encode a pseudorandom noise (PN) ranging code that is synchronized with satellite system time when transmitted by the second node;
    determining an offset in the first node based on the PN ranging code originally sent by and received from the second node and satellite system time;
    using the offset to determine range from the first node to the second node; and
    retrieving an absolute position of the second node encoded on the PN ranging code, and using the range to the second node and the absolute position of the second node to supplement positioning of the first node obtained via Global Positioning System (GPS).

11. A method in a data processing unit of indirectly calculating an absolute position of a first node, the method comprising:
    determining ranges among at least a subset of a plurality of nodes including between the first node and a second node, wherein each node of the plurality of nodes is synchronized to GPS system time, wherein each node:
      transmits UWB pulses encoding a particular pseudorandom noise (PN) ranging code, wherein the PN ranging code is synchronized with GPS system time when transmitted;
      determines an offset between a received PN ranging code originating from another node of the plurality of nodes and GPS system time to determine range from the node that sent the PN ranging code;
    using the ranges to resolve relative positioning at least with respect to the second node, wherein the second node is aware of an absolute position via GPS;
    receiving an indication of the absolute position of the second node; and
    combining the indication of the absolute position of the second node and the relative positioning to the second node to compute the indirectly-calculated absolute position of the first node.

12. A method in a data processing unit of indirectly calculating an absolute position of a first node, the method comprising:
    determining ranges among at least a subset of a plurality of nodes including between the first node and a second node, wherein ranging is performed using UWB pulses encoding a pseudorandom noise (PN) ranging code, wherein the range between the first node and the second node is cooperatively determined by communication in both directions to and from the first node and the second node, wherein the second node is aware of an absolute position;
    using the ranges to resolve relative positioning at least with respect to the second node;
    receiving an indication of the absolute position of the second node;
    combining the indication of the absolute position of the second node and the relative positioning to the second node to compute the indirectly-calculated absolute position of the first node;
    determining relative positioning to one or more additional nodes;

receiving indications of the absolute positions of the one or more additional nodes; and combining the relative positioning and the absolute positions of the one or more additional nodes to compute one or more additional indirectly-calculated absolute positions.

13. A method in a data processing unit of indirectly calculating an absolute position of a first node, the method comprising:

determining ranges among at least a subset of a plurality of nodes including between the first node and a second node, wherein the range between the first node and the second node is cooperatively determined by communication in both directions to and from the first node and the second node, wherein the second node is aware of an absolute position;

using the ranges to resolve relative positioning at least with respect to the second node;

receiving an indication of the absolute position of the second node;

combining the indication of the absolute position of the second node and the relative positioning to the second node to compute the indirectly-calculated absolute position of the first node;

computing a second absolute position for the first node via satellite navigation; and combining the second absolute position with the indirectly-calculated absolute position of the first node using an unequal weighting to generate an aggregate absolute position, wherein weights are at least partially based on an estimated clock error.

14. The method as defined in claim 12, wherein the absolute position of the second node is obtained via satellite navigation.

15. The method as defined in claim 12, wherein the absolute position of the second node is derived from an inertial measurement unit (IMU).

16. The method as defined in claim 12, further comprising communicating with the second node to receive the absolute position of the second node.

17. The method as defined in claim 12, further comprising:
modulating a PN ranging code to communicate a message, wherein the message includes an indication of the absolute position; and determining range using the pseudorandom noise (PN) ranging code.

18. A method in a data processing unit of indirectly calculating an absolute position of a first node, the method comprising:

determining ranges among at least a subset of a plurality of nodes including between the first node and a second node, wherein ranging is performed using UWB pulses encoding a pseudorandom noise (PN) ranging code, wherein the range between the first node and the second node is cooperatively determined by communication in both directions to and from the first node and the second node, wherein the second node is aware of an absolute position;

using the ranges to resolve relative positioning at least with respect to the second node;

receiving an indication of the absolute position of the second node;

combining the indication of the absolute position of the second node and the relative positioning to the second node to compute the indirectly-calculated absolute position of the first node;

computing a second absolute position for the first node via satellite navigation; and combining the second absolute position with the indirectly-calculated absolute position of the first node to generate an aggregate absolute position.

19. The method as defined in claim 18, further comprising combining via averaging.

20. The method as defined in 13, wherein ranging is performed using UWB pulses encoding a pseudorandom noise (PN) ranging code.

21. The method as defined in claim 12, wherein none of the plurality of nodes correspond to a space vehicle of a satellite positioning system, wherein the ranges are determined with greater precision than is attainable from a satellite positioning system.

* * * * *